(12) United States Patent
Kawase et al.

(10) Patent No.: US 11,393,188 B2
(45) Date of Patent: Jul. 19, 2022

(54) RECEPTION APPARATUS, RECEPTION SYSTEM, RECEPTION METHOD AND STORAGE MEDIUM

(71) Applicant: NEC CORPORATION, Tokyo (JP)

(72) Inventors: Nobuaki Kawase, Tokyo (JP); Makoto Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/085,704

(22) PCT Filed: Jun. 8, 2017

(86) PCT No.: PCT/JP2017/021294
§ 371 (c)(1),
(2) Date: Sep. 17, 2018

(87) PCT Pub. No.: WO2017/217314
PCT Pub. Date: Dec. 21, 2017

(65) Prior Publication Data
US 2019/0095750 A1   Mar. 28, 2019

(30) Foreign Application Priority Data

Jun. 13, 2016   (JP) .............................. JP2016-117396

(51) Int. Cl.
*G06K 9/00* (2022.01)
*G06V 10/75* (2022.01)
(Continued)

(52) U.S. Cl.
CPC ......... *G06V 10/751* (2022.01); *B25J 11/0005* (2013.01); *G06F 16/00* (2019.01);
(Continued)

(58) Field of Classification Search
CPC ............ G06K 9/6202; G06K 9/00926; G06K 9/00228; G06K 9/00288; G06K 9/00268;
(Continued)

(56) References Cited

U.S. PATENT DOCUMENTS 7,152,050 B2   12/2006   Aoyama et al.
8,731,307 B2   5/2014   Kashiwagi
(Continued)

FOREIGN PATENT DOCUMENTS

JP   2002-175432 A   6/2002
JP   2002-264058 A   9/2002
(Continued)

OTHER PUBLICATIONS

Japanese Office Action of 2017-562085 filed Mar. 1, 2018.
(Continued)

*Primary Examiner* — Sean M Conner
(74) *Attorney, Agent, or Firm* — Sughrue Mion, PLLC

(57) ABSTRACT

Provided are a reception apparatus, a reception system, a reception method, and a storage medium that can naturally provide a personal conversation in accordance with a user without requiring the user to register the personal information thereof in advance. A disclosure includes a face information acquisition unit that acquires face information of a user; a conversation processing unit that acquires reception information including a content of conversation with the user; a face matching unit that matches, against the face information of one user, the face information registered in a user information database in which user information including the face information of the user and the reception information is registered; and a user information management unit that, when a result of matching of the face information performed by the face matching unit is
(Continued)

unmatched, registers the user information of the one user to the user information database.

7 Claims, 18 Drawing Sheets

(51) Int. Cl.
| | | |
|---|---|---|
| *G06T 7/00* | (2017.01) | |
| *G06F 21/32* | (2013.01) | |
| *B25J 11/00* | (2006.01) | |
| *G06F 16/00* | (2019.01) | |
| *G06F 16/24* | (2019.01) | |
| *G06V 40/50* | (2022.01) | |
| *G06V 40/16* | (2022.01) | |
| *G06F 16/903* | (2019.01) | |
| *G10L 13/00* | (2006.01) | |
| *G10L 15/26* | (2006.01) | |
| *G06F 3/16* | (2006.01) | |
| *G06K 9/62* | (2022.01) | |
| *G10L 15/22* | (2006.01) | |

(52) U.S. Cl.
CPC ........ *G06F 16/24* (2019.01); *G06F 16/90335* (2019.01); *G06F 21/32* (2013.01); *G06T 7/00* (2013.01); *G06V 40/161* (2022.01); *G06V 40/168* (2022.01); *G06V 40/172* (2022.01); *G06V 40/50* (2022.01); *G06F 3/16* (2013.01); *G06K 9/6215* (2013.01); *G06V 40/178* (2022.01); *G10L 13/00* (2013.01); *G10L 15/22* (2013.01); *G10L 15/26* (2013.01)

(58) Field of Classification Search
CPC ........ G06K 9/6215; G06K 2009/00322; G06F 16/90335; G06F 3/16; G10L 15/265; G10L 13/043; G10L 15/22
See application file for complete search history.

(56) References Cited

U.S. PATENT DOCUMENTS

| | | | | |
|---|---|---|---|---|
| 2004/0215463 | A1* | 10/2004 | Aoyama | G10L 15/26 704/270 |
| 2005/0151842 | A1 | 7/2005 | Oohashi | |
| 2011/0222782 | A1* | 9/2011 | Kashiwagi | G06K 9/00711 382/218 |
| 2012/0167234 | A1* | 6/2012 | Donfried | G06F 21/31 726/29 |
| 2013/0137516 | A1* | 5/2013 | Griswold | G07F 17/3218 463/36 |
| 2013/0195316 | A1 | 8/2013 | Bataller et al. | |
| 2013/0343615 | A1 | 12/2013 | Zhang et al. | |
| 2015/0371260 | A1 | 12/2015 | Chan et al. | |
| 2016/0354165 | A1* | 12/2016 | Uenoyama | A61B 34/30 |
| 2017/0140409 | A1 | 5/2017 | Liu et al. | |
| 2018/0294001 | A1* | 10/2018 | Kayama | G10L 15/02 |

FOREIGN PATENT DOCUMENTS

| | | |
|---|---|---|
| JP | 2004-101901 A | 4/2004 |
| JP | 2004-252111 A | 9/2004 |
| JP | 2004-302645 A | 10/2004 |
| JP | 2005-111603 A | 4/2005 |
| JP | 2005-279828 A | 10/2005 |
| JP | 2006-208964 A | 8/2006 |
| JP | 2007-125646 A | 5/2007 |
| JP | 2007-190659 A | 8/2007 |
| JP | 2007-324978 A | 12/2007 |
| JP | 2010-176510 A | 8/2010 |
| JP | 2011-188342 A | 9/2011 |
| JP | 2011-257959 A | 12/2011 |
| JP | 2012-32928 A | 2/2012 |
| JP | 2014-042235 A | 3/2014 |
| JP | 2014-206683 A | 10/2014 |
| JP | 2015-132955 A | 7/2015 |
| WO | 2015/093382 A1 | 6/2015 |
| WO | 2016/065362 A1 | 4/2016 |

OTHER PUBLICATIONS

International Search report of PCT/JP2017/021294 filed Aug. 22, 2017.
Communication dated Jan. 9, 2019 from the European Patent Office in application No. 17813212.2.
Communication dated May 26, 2020, from the Japanese Patent Office in Application No. 2018-128061.
Notice of Reasons for Refusal dated Jun. 25, 2019 issued by the Japanese Patent Office in counterpart application No. 2018-128061.
Communication dated Jan. 9, 2020, from the Japanese Patent Office in Application No. 2018-128061.
Office Action dated Oct. 22, 2019 issued in U.S. Appl. No. 16/274,895.
Communication dated Aug. 11, 2020 from Japanese Patent Office in JP Application No. 2018-128061.
Japanese Office Action for JP Application No. 2020-187663 dated Dec. 14, 2021 with English Translation.
EP Summons to attend oral proceedings for EP Application No. EP17813212.2 dated on Jun. 30, 2021.
US Office Action and PTO-892 for U.S. Appl. No. 16/274,895 dated Oct. 29, 2021.
U.S. Office Action for U.S. Appl. No. 16/274,895 dated May 13, 2021.
U.S. Office Action for U.S. Appl. No. 16/274,895 dated Mar. 17, 2022.

\* cited by examiner

FIG. 3

| ANONYMOUS ID | FACE FEATURE AMOUNT | ESTIMATED AGE | ESTIMATED GENDER | CONVERSATION HISTORY | RECEPTION DATE AND TIME |
|---|---|---|---|---|---|
| E32ve3 | 32282924 | 20 | MALE | SIZE 89 | 4/27 10:38 |
| 23io932 | 23283323 | 10 | FEMALE | BIRTH ON APRIL 2 | 4/24 09:15 |
| Ko28ew | 42929082 | 30 | MALE | LIKES TRAVELING | 4/22 06:43 |

FIG. 8A

| ANONYMOUS ID | FACE FEATURE AMOUNT | ESTIMATED AGE | ESTIMATED GENDER | CONVERSATION HISTORY | RECEPTION DATE AND TIME | ROBOT ID |
|---|---|---|---|---|---|---|
| E32ve3 | 32282924 | 20 | MALE | SIZE 89 | 4/27 10:38 | ROBOT A |
| 23Io932 | 23283323 | 10 | FEMALE | BIRTH ON APRIL 2 | 4/24 09:15 | ROBOT A |
| Ko23ew | 42929082 | 30 | MALE | LIKES TRAVELING | 4/22 06:43 | ROBOT A |

FIG. 8B

| ANONYMOUS ID | FACE FEATURE AMOUNT | ESTIMATED AGE | ESTIMATED GENDER | CONVERSATION HISTORY | RECEPTION DATE AND TIME | ROBOT ID |
|---|---|---|---|---|---|---|
| Ieow84 | 12383120 | 30 | MALE | LIKES CURREY | 4/24 09:22 | ROBOT B |
| K9d833 | 02937289 | 40 | FEMALE | LIKES YELLOW | 4/22 06:43 | ROBOT B |
| kdow94 | 38293832 | 20 | MALE | FROM KYOTO | 4/22 08:21 | ROBOT B |

FIG. 8C

| ANONYMOUS ID | FACE FEATURE AMOUNT | ESTIMATED AGE | ESTIMATED GENDER | CONVERSATION HISTORY | RECEPTION DATE AND TIME | ROBOT ID |
|---|---|---|---|---|---|---|
| E32ve3 | 32282924 | 20 | MALE | SIZE 89 | 4/27 10:38 | ROBOT A |
| 23lo932 | 23283323 | 10 | FEMALE | BIRTH ON APRIL 2 | 4/24 09:15 | ROBOT A |
| Ko28ew | 42929082 | 30 | MALE | LIKES TRAVELING | 4/22 06:43 | ROBOT A |
| leow84 | 12383120 | 30 | MALE | LIKES CURREY | 4/24 09:22 | ROBOT B |
| K9d833 | 02937289 | 40 | FEMALE | LIKES YELLOW | 4/22 06:43 | ROBOT B |
| kdow94 | 38293832 | 20 | MALE | FROM KYOTO | 4/22 08:21 | ROBOT B |

FIG. 12

| ANONYMOUS ID | APPEARANCE INFORMATION | | | RECEPTION INFORMATION | | RECEPTION ROBOT INFORMATION | | | |
|---|---|---|---|---|---|---|---|---|---|
| | FACE FEATURE AMOUNT | ESTIMATED AGE | ESTIMATED GENDER | CONVERSATION HISTORY | RCONVERSATION HISTORY | ROBOT ID | SHOT NAME | MUNICIPALITY | ADMINISTRATIVE DISTRICT |
| E32ve3 | 32282924 | 20 | MALE | SIZE 89 | 4/27 10:38 | ROBOT A | TAMACHI SHOP | MINATO WARD | TOKYO |
| 23io932 | 23283323 | 10 | FEMALE | BIRTH ON APRIL 2 | 4/24 09:15 | ROBOT A | TAMACHI SHOP | MINATO WARD | TOKYO |
| Ko28ew | 42929082 | 30 | MALE | LIKES TRAVELING | 4/22 06:43 | ROBOT A | TAMACHI SHOP | MINATO WARD | TOKYO |
| Ieow84 | 12383120 | 30 | MALE | LIKES CURREY | 4/24 09:22 | ROBOT B | SHINAGAWA SHOP | MINATO WARD | TOKYO |
| K9d833 | 02937289 | 40 | FEMALE | LIKES YELLOW | 4/22 06:43 | ROBOT B | SHINAGAWA SHOP | MINATO WARD | TOKYO |
| kdow94 | 38293832 | 20 | MALE | FROM KYOTO | 4/22 08:21 | ROBOT B | SHINAGAWA SHOP | MINATO WARD | TOKYO |
| 23io932 | 23283323 | 20 | FEMALE | LIKES TRAVELING | 4/21 06:40 | ROBOT C | TAMAGAWA SHOP | KAWASAKI CITY | KANAGAWA |

RECEPTION APPARATUS, RECEPTION SYSTEM, RECEPTION METHOD AND STORAGE MEDIUM

This application is a National Stage of International Application No. PCT/JP2017/021294 filed Jun. 8, 2017, claiming priority based on Japanese Patent Application No. 2016-117396 filed Jun. 13, 2016.

TECHNICAL FIELD

The present invention relates to a reception apparatus, a reception system, a reception method, and a storage medium that utilize a face matching.

BACKGROUND ART

Robots have been widespread as industrial robots in manufacturing sites in a manufacturing industry so far. Moreover, in recent years, robots that provide reception such as conversation with a user have been widely applied in various fields such as a retailing industry, a service industry, an entertainment industry, a medical industry, and the like.

Patent Literature 1 discloses a service-providing system that provides a service such as nursing that has an experience information database that manages pieces of experience information on a plurality of users in association with identification information of each user and a service-providing robot that provides a service to the user. In the system disclosed in Patent Literature 1, the service-providing robot acquires user identification information by contacting to each user, accesses the experience information database, and uses the user identification information to extract experience information of the user. The service-providing robot provides a service that meets a demand from the user based on the experience information.

CITATION LIST

Patent Literature

PTL 1: International Publication No. WO2015/093382

SUMMARY OF INVENTION

Technical Problem

In the art disclosed in Patent Literature 1, however, it is necessary for the user to register personal information in advance that is identification information used for identifying the user. For example, a robot identifies a user by using face matching based on a face feature amount extracted from a face image of the user. In this case, the user is required to prepare a face photograph and register in advance personal information including a face feature amount. Such pre-registration of personal information is laborious for a user, which has been an obstacle for spread of reception systems using a robot.

Further, in the art disclosed in Patent Literature 1, when no personal information for identifying a user is registered in the database in advance, it is difficult to provide reception such as personal conversation in accordance with a user.

The example object of the present invention is to provide a reception apparatus, a reception system, a reception method, and a storage medium that can naturally provide a personal conversation in accordance with a user without requiring the user to register personal information thereof in advance.

Solution to Problem

According to an example aspect of the present invention, provided is a reception apparatus including a face information acquisition unit that acquires face information of a user; a conversation processing unit that acquires reception information including a content of conversation with the user; a face matching unit that matches, against the face information of one user, the face information registered in a user information database in which user information including the face information of the user and the reception information is registered; and a user information management unit that, when a result of matching of the face information performed by the face matching unit is unmatched, registers the user information of the one user to the user information database.

According to another example aspect of the present invention, provided is a reception system including reception apparatuses and a server that can communicate with the reception device via a network. Each of the reception apparatuses includes a face information acquisition unit that acquires face information of a user, a conversation processing unit that acquires reception information including a content of conversation with the user, a first storage unit that stores a first user information database in which user information including the face information of the user and the reception information is registered, a face matching unit that matches, against the face information of one user, the face information registered in the first user information database, and a user information management unit that, when a result of matching of the face information performed by the face matching unit is unmatched, registers the user information of the one user to the first user information database in the first storage unit. The server includes a second storage unit that stores a second user information database in which user information including the face information of the user acquired by the reception apparatuses and the reception information is registered. The user information management unit synchronizes the first user information database with the second user information database and updates a content of the first user information database to the same content as a content of the second user information database.

According to yet another example aspect of the present invention, provided is a reception method including: acquiring face information of a user; acquiring reception information including a content of conversation with the user; matching, against the face information of one user, the face information registered in a user information database in which user information including the face information of the user and the reception information is registered; and when a result of matching of the face information is unmatched, registering the user information of the one user to the user information database.

According to still another example aspect of the present invention, provided is a storage medium in which a program is stored, the program causing a computer to execute: acquiring face information of a user; acquiring reception information including a content of conversation with the user; matching, against the face information of one user, the face information registered in a user information database in which user information including the face information of the user and the reception information is registered; and when a result of matching of the face information is unmatched, registering the user information of the one user to the user information database.

Advantageous Effects of Invention

According to the present invention, it is possible to naturally provide a personal conversation in accordance with a user without requiring the user to register personal information thereof in advance.

BRIEF DESCRIPTION OF DRAWINGS

FIG. 3 is a schematic diagram illustrating an example of a user information database stored in a storage unit in the reception robot according to the first example embodiment of the present invention.

FIG. 8A is a schematic diagram illustrating an example of a user information database stored in a storage unit of a robot A in the reception system according to the second example embodiment of the present invention.

FIG. 8B is a schematic diagram illustrating an example of a user information database stored in a storage unit of a robot B in the reception system according to the second example embodiment of the present invention.

FIG. 8C is a schematic diagram illustrating an example of a user information database stored in a storage unit of a DB server in the reception system according to the second example embodiment of the present invention.

FIG. 12 is a schematic diagram illustrating an example of a user information database in a reception system according to a fourth example embodiment of the present invention.

DESCRIPTION OF EMBODIMENTS

First Example Embodiment

A reception robot and a reception method according to a first example embodiment of the present invention will be described by using FIG. 1 to FIG. 5.

Figure 1:
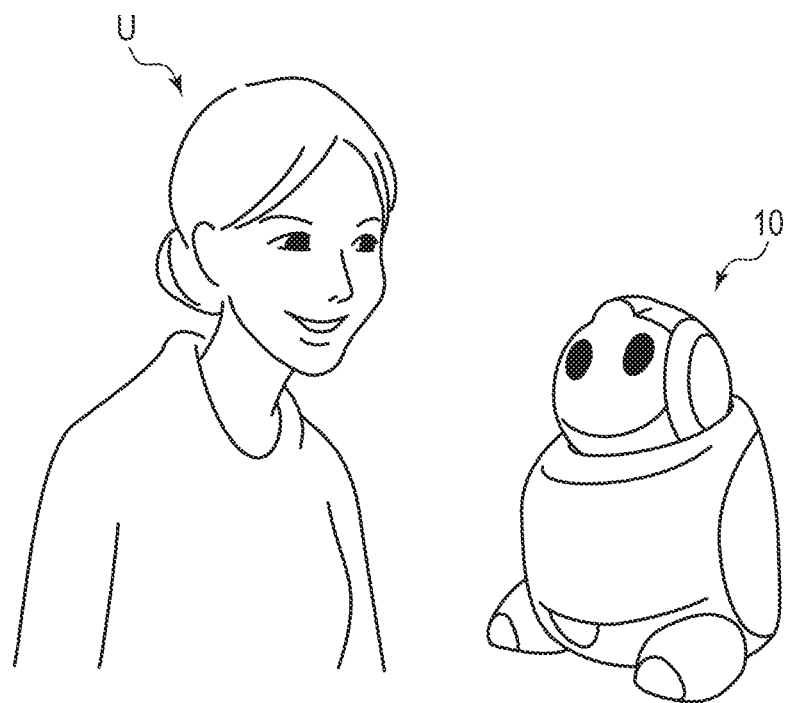
FIG. 1 is a schematic diagram illustrating a reception robot according to a first example embodiment of the present invention.
Figure 2:
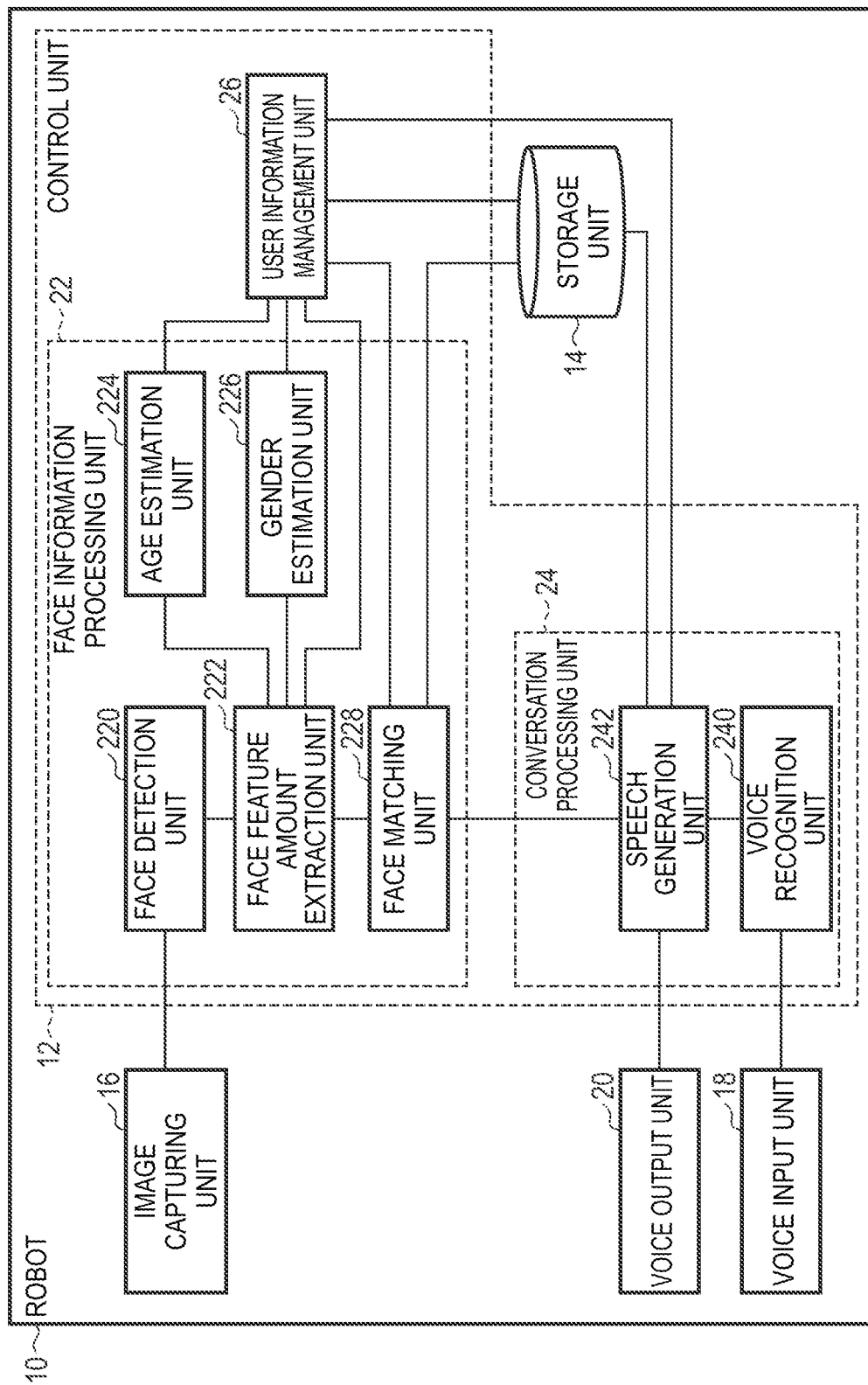
FIG. 2 is a block diagram illustrating a functional configuration of the reception robot according to the first example embodiment of the present invention.
Figure 4:
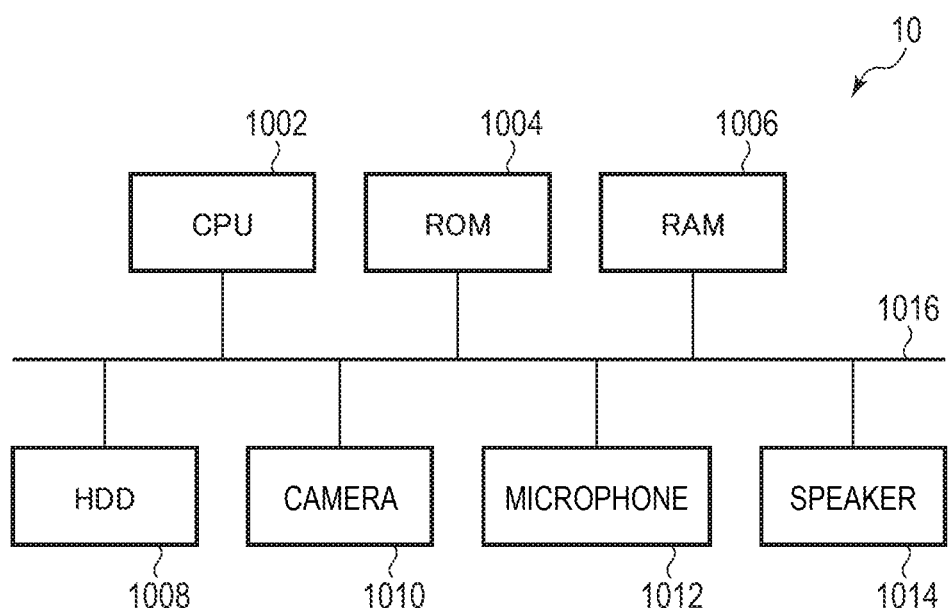
FIG. 4 is a block diagram illustrating an example of a hardware configuration of the reception robot according to the first example embodiment of the present invention.

First, a reception robot according to the present example embodiment will be described by using FIG. 1 to FIG. 4. FIG. 1 is a schematic diagram illustrating a reception robot according to the present example embodiment. FIG. 2 is a block diagram illustrating a functional configuration of the reception robot according to the present example embodiment. FIG. 3 is a schematic diagram illustrating an example of a user information DB stored in a storage unit in the reception robot according to the present example embodiment. FIG. 4 is a block diagram illustrating an example of a hardware configuration of the reception robot according to the present example embodiment.

A reception robot (hereafter, also simply referred to as "robot") according to the present example embodiment is one of the reception apparatuses that are deployed in a shop, for example, and attend a user to wait on customers. A shop where the robot according to the present example embodiment is deployed is not limited in particular and may be a shop which sells items to a user that is a customer, a shop which provides a service to a user that is a customer, or the like, for example.

As illustrated in FIG. 1, a robot 10 according to the present example embodiment has conversation with a facing user U to attend the user. The robot 10 is configured to start attending the user U in response to detection of the facing user U. The robot 10 may be configured to detect the user U based on an image captured by an image capturing unit 16 described later, or a human detection sensor such as a heat sensor that can sense the user U may be provided. Further, the robot 10 may be configured to start attending the user U by pressing a start button (not illustrated) provided on the robot 10. Note that the external shape of the robot 10 is not limited to the external shape illustrated in FIG. 1, and various external shape such as an external shape representing a human or an animal may be employed.

As illustrated in FIG. 2, the robot 10 according to the present example embodiment has a control unit 12, a storage unit 14, the image capturing unit 16, a voice input unit 18, and a voice output unit 20. The control unit 12 controls the entire operation of the robot 10 according to the present example embodiment. The storage unit 14 stores a user information database (DB) in which user information that is information on the user is registered anonymously. The image capturing unit 16 capture an image of a user to acquire an image of the user and input image data of the acquired image to the control unit 12. The voice input unit 18 converts a voice uttered by the user into audio data and inputs the converted audio data to the control unit 12. The voice output unit 20 converts the audio data used for conversation with the user generated by the control unit 12 into a voice and outputs it to the user. The control unit 12, the storage unit 14, the image capturing unit 16, the voice input unit 18, and the voice output unit 20 are mounted inside a casing of the robot 10.

The control unit 12 is formed of a processor such as a central processing unit (CPU), for example. The control unit 12 has a face information processing unit 22, a conversation processing unit 24, and a user information management unit 26 as function blocks. Note that, all or some of the control unit 12 may be configured on a server that can communicate with the robot 10 via a network.

The face information processing unit 22 processes an image of a user captured by the image capturing unit 16 and performs acquisition of user appearance information including a user face information, matching of face information, or the like. The face information processing unit 22 further has a face detection unit 220, a face feature amount extraction unit 222, an age estimation unit 224, a gender estimation unit 226, and a face matching unit 228 as function blocks.

To the face detection unit 220, image data of a user image captured by the image capturing unit 16 is input from the image capturing unit 16. The face detection unit 220 performs face detection on a user image based on the image data input from the image capturing unit 16. Thereby, the face detection unit 220 detects a user face image from the user image captured by the image capturing unit 16. An algorithm used for face detection by the face detection unit 220 is not limited in particular, and various algorithms may be used to perform face detection. Note that, in terms of protecting privacy of the user, the face information processing unit 22 may be configured to discard the user image from which a face image has been detected after the face is detected by the face detection unit 220. Note that, when a group of a plurality of persons, such as family, friends, coworkers, or the like, visit the place where the robot 10 is installed or the like, a plurality of persons may be captured in an image that is captured by the image capturing unit 16. In such a case, the face detection unit 220 can detect a face image of a person whose mouse is moving as a face image of an uttering user.

The face feature amount extraction unit 222 extracts a face feature amount that is a feature amount of a face image for the face image detected by the face detection unit 220. The face feature amount extraction unit 222 functions as a face information acquisition unit that acquires a face feature amount that is face information.

The face feature amount extracted by the face feature amount extraction unit 222 is a vector amount, which is a combination of components of scaler amounts representing a feature of a face image. The component of a face feature amount is not limited in particular, and various types of components may be used. For example, as a component of a face feature amount, a positional relationship such as the distance, the angle, or the like between feature points set at the center or the end of an organ of a face such as an eye, a nose, a mouth, or the like, a curvature of the outline of the face, a color distribution or a shade value of the face surface, or the like can be used. The number of components of the face feature amount is also not limited in particular, and any number may be set as appropriate in accordance with a required matching accuracy, a processing speed, or the like. The face feature amount extracted by the face feature amount extraction unit 222 forms a part of user appearance information. Note that user appearance information forms a part of user information. Note that, in terms of protecting privacy of the user, the face information processing unit 22 may be configured to discard a face image from which the face feature amount has been extracted after the face feature amount is extracted by the face feature amount extraction unit 222. Further, the face feature amount is irreversible data from which the source face image for extraction cannot be reconfigured. Thus, in the robot 10 according to the present example embodiment, while the face feature amount is registered in the user information DB as described later, protection of user privacy is taken into consideration.

The age estimation unit 224 estimates the age of a user based on a face feature amount extracted by the face feature amount extraction unit 222. The component of a face feature amount and the algorithm used for age estimation by the age estimation unit 224 are not limited in particular, respectively, and various components of a face feature amount and algorithms in accordance with the components may be used to perform age estimation. The estimated age of a user estimated by the age estimation unit 224 configures a part of user appearance information.

The gender estimation unit 226 estimates the gender of a user based on the face feature amount extracted by a face feature amount extraction unit 222. The component of a face feature amount and the algorithm used for gender estimation by the gender estimation unit 226 are not limited in particular, respectively, and various components of a face feature amount and algorithms in accordance with the components may be used to perform gender estimation. The estimated gender of a user estimated by the gender estimation unit 226 configures a part of user appearance information.

The face feature amount extracted by the face feature amount extraction unit 222, the estimated age estimated by the age estimation unit 224, and the estimated gender estimated by the gender estimation unit 226 are registered in the user information DB of the storage unit 14 by the user information management unit 26 as described later.

The face matching unit 228 matches, against a face feature amount of user information registered in the user information DB of the storage unit 14, a face feature amount of a face image of a user being attended captured by the image capturing unit 16 by using a face matching engine. The face matching unit 228 performs such matching sequentially on multiple pieces of user information registered in the user information DB. Thereby, the face matching unit 228 searches for the same person as the user being attended out of users in the user information registered in the user information DB and attempts to find the same person. In this operation, the face matching unit 228 calculates a matching score in accordance with the similarity between face feature amounts on matching. A higher similarity between face feature amounts results in a larger matching score. The face matching unit 228 determines that the matching is matched if the matching score is greater than or equal to a predetermined threshold and determines that a user on the matched matching in the user information registered in the user information DB is the same person as the user being attended. On the other hand, the face matching unit 228 determines that the matching is unmatched if the matching score is less than the predetermined threshold and determines that a user on the unmatched matching in the user information registered in the user information DB is a different person from the user being attended.

The face matching unit 228 transfers, to the user information management unit 26 and a speech generation unit 242 of the conversation processing unit 24, a matching result as to whether or not the same person as the user being attended has been found through the searching out of users in the user information registered in the user information DB. That is, the face matching unit 228 transfers the matching result as to whether the matching is matched or unmatched to the user information management unit 26 and the speech generation unit 242 of the conversation processing unit 24. When the matching is matched and the same person has been found, the face matching unit 228 transfers an anonymous ID of the user found as the same person to the user information management unit 26 and the speech generation unit 242 along with the matching result.

The user being attended, the same person as which has been found as a result of matching performed by the face matching unit 228, is a person that the robot 10 has attended in the past. On the other hand, the user being attended, no same person of which has been found, is a person which the robot 10 has not attended, that is, the robot 10 attends for the first time.

The conversation processing unit 24 generates audio data forming conversation that is in accordance with a user being attended. The conversation processing unit 24 further has a voice recognition unit 240 and the speech generation unit 242 as function blocks.

To the voice recognition unit 240, audio data of a voice uttered by a user is input from the voice input unit 18. The voice recognition unit 240 recognizes a voice uttered by the user based on an audio signal input from the voice input unit 18 and generates text data corresponding to the voice. The algorithm used in voice recognition by the voice recognition unit 240 is not limited in particular, and various algorithms can be used to perform voice recognition.

The speech generation unit 242 generates text data forming a speech to the user by using a speech engine and generates audio data of a voice corresponding to the text data. Specifically, based on the text data generated by the voice recognition unit 240, the speech generation unit 242 can generate audio data of a response voice in accordance with the content of a voice uttered by the user. Further, the speech generation unit 242 can also generate audio data of a voice that brings up a topic to the user. The audio data generated by the speech generation unit 242 is output as a voice from the voice output unit 20 to the user.

Further, the speech generation unit 242 acquires a conversation history including the content of conversation with the user. The conversation history acquired by the speech generation unit 242 includes the conversation content made of the content of the text data corresponding to the voice uttered by the user and the content of the text data generated by the speech generation unit 242. Moreover, the speech generation unit 242 acquires reception date and time when the user is attended. The conversation history and the reception date and time form reception information. The reception information including the conversation history acquired by the speech generation unit 242 and the reception date and time form a part of user information. Note that the conversation content contained in the conversation history may be the conversation content itself, an abstract of the conversation content, a keyword included in the conversation content, or the like. Further, the reception date and time may be the date and time when the reception is started, may be the date and time when the reception is finished, or may include both thereof, for example. Further, the reception date and time may be the date and time when a user image is captured by the image capturing unit 16. Further, the speech generation unit 242 can acquire, as reception information, the reception time period taken from the start to the end of reception to the user, together with the reception date and time.

Further, once a matching result to the effect that the same person has been found is transferred from the face matching unit 228 of the face information processing unit 22, the speech generation unit 242 acquires, from the user information DB of the storage unit 14, user information on the user found as the same person based on the anonymous ID transferred along with the matching result. Note that the speech generation unit 242 is not necessarily required to acquire whole user information and may acquire at least any of an estimated age, an estimated gender, a conversation history, and reception date and time included in the user information. However, in order to have a more personal conversation, it is preferable that the speech generation unit 242 acquire at least a conversation history.

In accordance with user information acquired from the user information DB, the speech generation unit 242 generates text data forming a personal conversation by using a speech engine for the user being attended. That is, the speech generation unit 242 utilizes a conversation history and reception date and time included in the acquired user information to generate text data forming a personal conversation by using the speech engine. Further, the speech generation unit 242 may further utilize an estimated age and an estimated gender included in the acquired user information to generate text data forming a personal conversation by using the speech engine. For example, when a conversation content which identifies a birthday is included in the conversation history obtained in the past and when the date of attending the user is close to the birthday, the speech generation unit 242 can generate text data such as "Your birthday is coming soon, right?" as text data forming the speech. Note that, when generating text data of conversation, the speech generation unit 242 is not always required to utilize all of the conversation history, the reception date and time, the estimated age, and the estimated gender but may utilize as appropriate some or all of the conversation history, the reception date and time, the estimated age, and the estimated gender.

The user information management unit 26 registers the user information automatically acquired by the face information processing unit 22 and the conversation processing unit 24 to the user information DB stored in the storage unit 14. As described above, in the face information processing unit 22 and the conversation processing unit 24, the face feature amount, the estimated age, and the estimated gender are acquired as user information on the attended user. Further, in the conversation processing unit 24, the conversation history and the reception date and time are acquired as user information on the attended user. The user information management unit 26 registers these pieces of user information to the user information DB stored in the storage unit 14. Note that the user information management unit 26 can delete, from the user information DB, user information with which a certain period has elapsed from the registration to the user information DB. Deletion of the user information after a certain period has elapsed allows the robot 10 according to the present example embodiment to further take protection of user privacy into consideration.

FIG. 3 illustrates an example of the user information DB stored in the storage unit 14. User information on the user attended in the past is registered in the user information DB. As illustrated in FIG. 3, user information is registered in the record in the user information DB in association with an anonymous identification (ID) that is an anonymous identifier provided to each attended user. The registered user information includes the face feature amount, the estimated age, the estimated gender, the conversation history, and the reception date and time acquired for the user. The face feature amount, the estimated age, and the estimated gender form user appearance information. The conversation history and the reception date and time form reception information. The user information DB is an anonymous ID in which each registered user is not identified as a particular person. That is, while the user information including appearance information and reception information is registered in each record of the user information DB, it is not possible to know from the user information who is each individual user registered in each record. Note that, in examples of the user information DB illustrated in FIG. 3 and FIG. 8A, FIG. 8B, FIG. 8C, and FIG. 12 described later, the face feature amount is indicated in a numeric string for simplified illustration.

The user information management unit 26 generates and provides an anonymous ID on a user basis. The user information management unit 26 registers, to the record of the user information DB, the face feature amount, the estimated age, the estimated gender, and the reception date and time that is the user information acquired on that user in association with the anonymous ID provided to the user.

Once a matching result to the effect that no same person has been found, that is, an unmatched matching result is transferred from the face matching unit 228 of the face information processing unit 22, the user information management unit 26 automatically performs new registration of the user information. In this case, the user information management unit 26 provides a new anonymous ID to the user, no same person as which has been found, and registers the user information.

On the other hand, once a matching result to the effect that the same person has been found, that is, a matched matching result is transferred from the face matching unit 228, the user information management unit 26 automatically performs additional registration of the user information. In this case, the user information management unit 26 provides, to the user being attended the same person as which has been found, the same anonymous ID as the anonymous ID of the user determined as the same person or a new anonymous ID associated with the anonymous ID of the user determined as the same person and additionally registers the user information. For example, when the estimated age has changed, the estimated age is additionally registered. Further, a new conversation history is additionally registered.

The image capturing unit 16 is provided to be able to capture an image in front of the robot 10 and configured to be able to capture an image of a user facing the robot 10. The image capturing unit 16 is formed of a digital still camera or a digital video camera, for example, and captures a user being attended to acquire an image of the user, as described above. When starting attending a user, for example, the image capturing unit 16 can capture the user. The image capturing unit 16 captures an image including a face of a user such as an upper part of user's body, or the like. The image capturing unit 16 inputs image data of the acquired image to the control unit 12.

The voice input unit 18 is formed of a microphone, for example, and converts a voice uttered by the user being attended into audio data, as described above. The voice input unit 18 converts a voice uttered by the user into audio data during the user being attended. The voice input unit 18 inputs the converted audio data to the control unit 12.

The voice output unit 20 is formed of a speaker, for example, and converts audio data used for speech to the user generated by the conversation processing unit of the control unit 12 into a voice and outputs it to the user, as described above.

The robot 10 described above is formed of a computer apparatus, for example. An example of the hardware configuration of the robot 10 will be described by using FIG. 4. Note that the robot 10 may be formed of a single apparatus or may be formed of two or more physically separated apparatuses coupled to each other through wired or wireless connection.

The robot 10 has a CPU 1002, a read only memory (ROM) 1004, a random access memory (RAM) 1006, and a hard disk drive (HDD) 1008, as illustrated in FIG. 4. Further, the robot 10 has a camera 1010, a microphone 1012, and a speaker 1014. The CPU 1002, the ROM 1004, the RAM 1006, the HDD 1008, the camera 1010, the microphone 1012, and the speaker 1014 are connected to a common bus line 1016.

The CPU 1002 controls the entire operation of the robot 10. Further, the CPU 1002 executes programs implementing the function of respective units of the face detection unit 220, the face feature amount extraction unit 222, the age estimation unit 224, the gender estimation unit 226, and the face matching unit 228 in the face information processing unit 22 described above. Further, the CPU 1002 executes programs implementing the functions of respective units of the voice recognition unit 240 and the speech generation unit 242 in the conversation processing unit 24 described above. The CPU 1002 implements the functions of respective units of the face information processing unit 22 and the conversation processing unit 24 by loading the program stored in the HDD 1008 or the like to the RAM 1006 and executing it.

The ROM 1004 stores a program such as a boot program therein. The RAM 1006 is used as a working area when the CPU 1002 executes a program. Further, the HDD 1008 stores a program executed by the CPU 1002.

Further, the HDD 1008 is a storage apparatus that implements the function of the storage unit 14 described above. Note that a storage apparatus that implements the function of the storage unit 14 is not limited to the HDD 1008. Various storage apparatuses can be used for implementing the function of the storage unit 14.

The camera 1010 is an image capturing apparatus that implements the function of the image capturing unit 16 described above. The microphone 1012 is a voice input apparatus that implements the function of the voice input unit 18 described above. The speaker 1014 is a voice output apparatus that implements the function of the voice output unit 20 described above.

Note that the hardware configuration of the robot 10 is not limited to the configuration described above but may be various configurations.

The robot 10 according to the present example embodiment can identify whether or not a user being attended is the same person as a past user without requiring the user to register personal information in advance. Moreover, the robot 10 according to the present example embodiment can naturally provide a personal conversation in accordance with the user being attended by utilizing user information including the conversation history, the reception date and time, the estimated age, and the estimated gender on the past user determined to be the same person as the user being attended.

Figure 5:
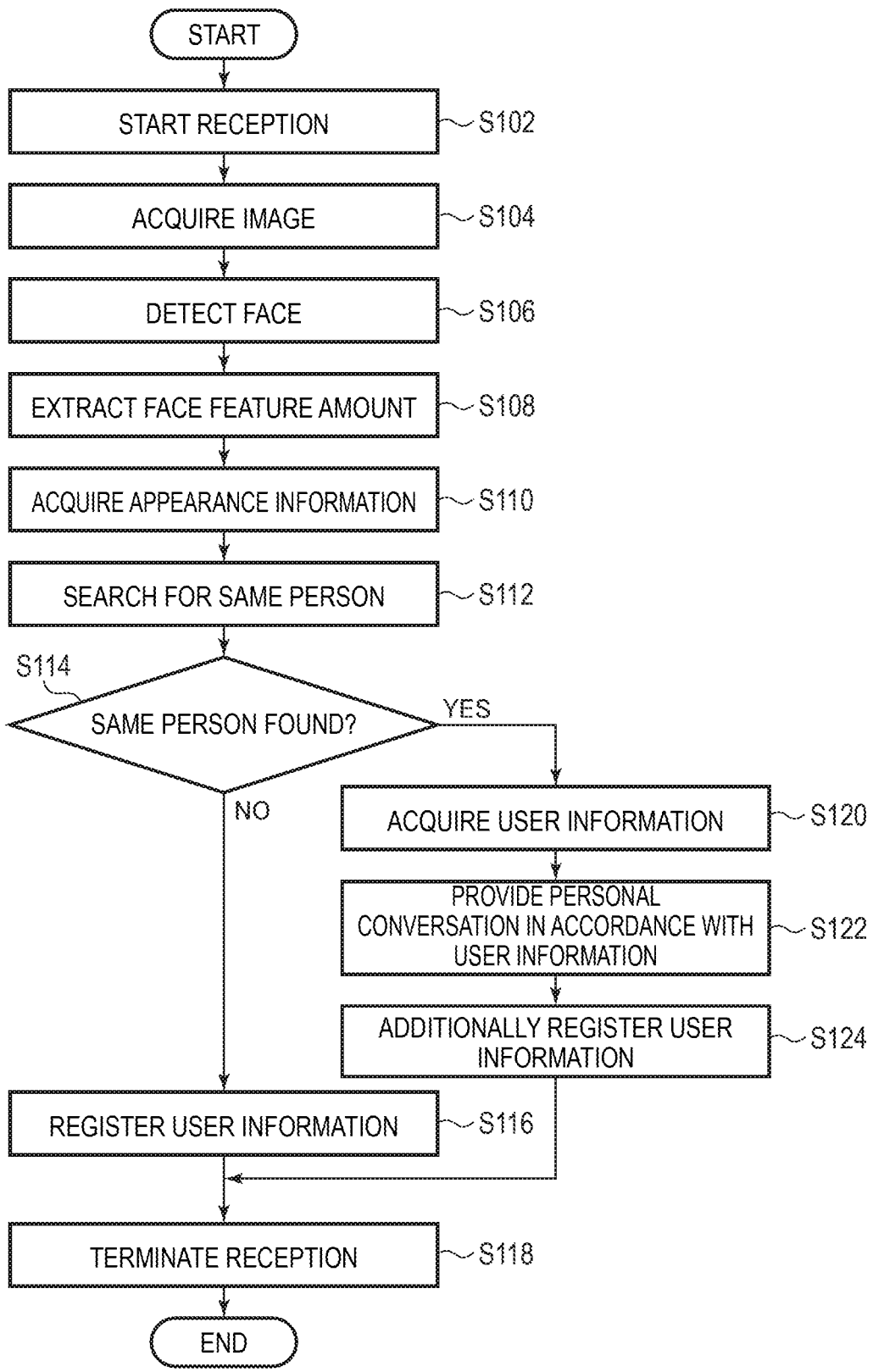
FIG. 5 is a flowchart illustrating a reception method according to the first example embodiment of the present invention.

A reception method according to the present example embodiment using the robot 10 according to the present example embodiment described above will be further described below by using FIG. 5. FIG. 5 is a flowchart illustrating the reception method according to the present example embodiment.

For example, the robot 10 deployed in a shop or the like detects a facing user and starts attending the user when the user that is a customer enters the shop and faces the robot 10 (step S102). The robot 10 has conversation with the user by using the conversation processing unit 24 when attending the user.

In conversation with the user, audio data of a voice uttered by the user is input to the voice recognition unit 240 from the voice input unit 18. The voice recognition unit 240 recognizes the voice uttered by the user based on an audio signal input from the voice input unit 18 and generates text data corresponding to the voice. Based on the text data generated by the voice recognition unit 240, the speech generation unit 242 generates audio data of a response voice in accordance with the content of the voice uttered by the user, as a response to the utterance of the user. Further, the speech generation unit 242 can generate not only a response to the utterance of the user but also audio data of a voice which brings up a topic to the user. The audio data generated by the speech generation unit 242 is output as a voice from the voice output unit 20 to the user.

The speech generation unit 242 acquires a conversation history including the conversation content with the user during the user being attended. Further, the speech generation unit 242 acquires a reception date and time when the user is attended.

Once the reception to the user is started, the image capturing unit 16 captures the user being attended to acquire an image of the user (step S104). Subsequently, the image capturing unit 16 inputs image data of the acquired image to the face detection unit 220 of the control unit 12.

In response to image data of the user image being input from the image capturing unit 16, the face detection unit 220 performs face detection on the user image based on the input image data (step S106). Thereby, the face detection unit 220 detects user face image from the user image captured by the image capturing unit 16.

The face feature amount extraction unit 222 extracts a face feature amount, which is a feature amount of a face image, for the face image detected by the face detection unit 220 (step S108).

The age estimation unit 224 estimates the age of the user based on the face feature amount extracted by the face feature amount extraction unit 222 and acquires an estimated age of the user. Further, the gender estimation unit 226 estimates the gender of the user based on the face feature amount extracted by the face feature amount extraction unit 222 and acquires an estimated gender of the user. In such a way, the face information processing unit 22 acquires user appearance information including the face feature amount, the estimated age, and the estimated gender of the user (step S110).

The face matching unit 228 matches the face feature amount of the face image detected by the face image of the user being attended against the face feature amount of the user registered in the user information DB of the storage unit 14 by using a face matching engine. Thereby, the face matching unit 228 searches for the same person as the user being attended out of the users registered in the user information DB (step S112). The face matching unit 228 transfers a matching result as to whether or not the same person has been found, that is, whether the matching is matched or unmatched to the user information management unit 26 and the speech generation unit 242 of the conversation processing unit 24. When the matching is matched and the same person has been found, the face matching unit 228 transfers an anonymous ID of the user found as the same person to the user information management unit 26 and the speech generation unit 242 along with the matching result.

As a result of matching performed by the face matching unit 228, if the matching result is unmatched and no same person is found (step S114, NO), the user information management unit 26 registers the user information (step S116). In this case, the user information management unit 26 provides a new anonymous ID to the user, no same person as which has been found, and registers the user information acquired for the user to the user information DB of the storage unit 14. The registered user information contains the face feature amount acquired in step S108 and the estimated age and the estimated gender acquired in step S110. Further, the registered user information includes the conversation history and the reception date and time acquired by the speech generation unit 242 during the user being attended. The registered conversation history here includes the contents of conversation with the user made from the start of the reception of step S102 to the end of the reception of step S118.

After step S116, the reception ends (step S118). Note that step S116 of registering user information may be performed after step S118 of terminating the reception.

On the other hand, as a result of matching performed by the face matching unit 228, if the matching result is matched and the same person has been found (step S114, YES), the speech generation unit 242 acquires user information of the user found as the same person from the user information DB of the storage unit 14 (step S120). At this time, the speech generation unit 242 acquires the user information from the user information DB based on the anonymous ID transferred along with the matching result from the face matching unit 228 of the face information processing unit 22.

The speech generation unit 242 utilizes the conversation history, the reception date and time, the estimated age, and the estimated gender included in the user information acquired in step S120 to generate text data forming a personal conversation by using a speech engine. Moreover, the speech generation unit 242 generates audio data corresponding to the generated text data. The audio data generated by the speech generation unit 242 is output as a voice from the voice output unit 20 to the user being attended.

In such a way, the robot 10 has a personal conversation with the user in accordance with the user information (step S122). The personal conversation is provided as needed until the reception ends. By having a personal conversation with a user in accordance with user information, it is possible to naturally provide a personal conversation in accordance with the user being attended.

Further, as a result of matching performed by the face matching unit 228, if the matching result is matched and the same person has been found (step S114, YES), the user information management unit 26 performs additional registration of the user information (step S124). The user information management unit 26 provides the same anonymous ID as the anonymous ID of the user determined as the same person or a new anonymous ID associated with the anonymous ID of the user determined as the same person to the user being attended, the same person as which has been found, and additionally registers the user information. The user information additionally registered here includes a new conversation history and reception date and time including a new conversation content made during reception and, if the estimated age acquired in step S110 has changed, includes the changed estimated age. Further, the conversation history additionally registered includes the content of conversation with the user made from the start of the reception at step S102 to the end of the reception at step S118.

After step S124, the reception is finished (step S118). Note that step S124 may be performed after step S118 of terminating the reception.

As described above, according to the present example embodiment, it is possible to identify whether or not a user being attended is the same person as a past user without requiring the user to register personal information in advance. Moreover, according to the present example embodiment, it is possible to naturally provide a personal conversation in accordance with the user being attended by utilizing user information including a conversation history, a reception date and time, an estimated age, and an estimated gender of the past user determined as the same person.

Second Example Embodiment

A reception system and a reception method according to a second example embodiment of the present invention will be described by using FIG. 6 to FIG. 10. Note that the same components as those in the reception robot and the reception method according to the first example embodiment described above are labeled with the same reference numerals, and the description thereof will be omitted or simplified.

Figure 6:
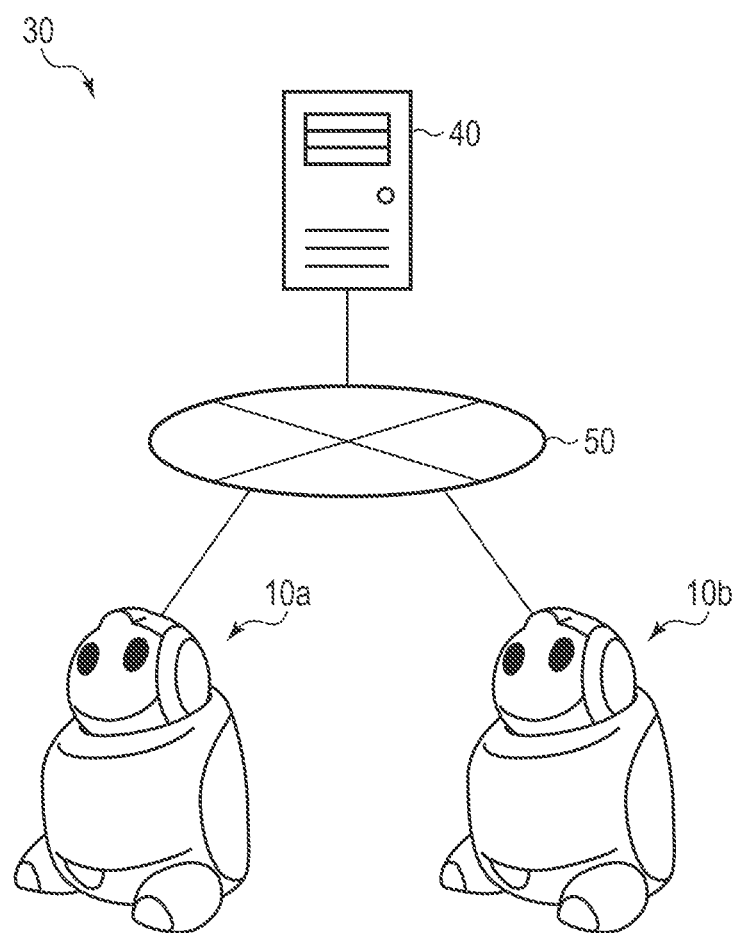
FIG. 6 is a schematic diagram illustrating a reception system according to a second example embodiment of the present invention.
Figure 7:
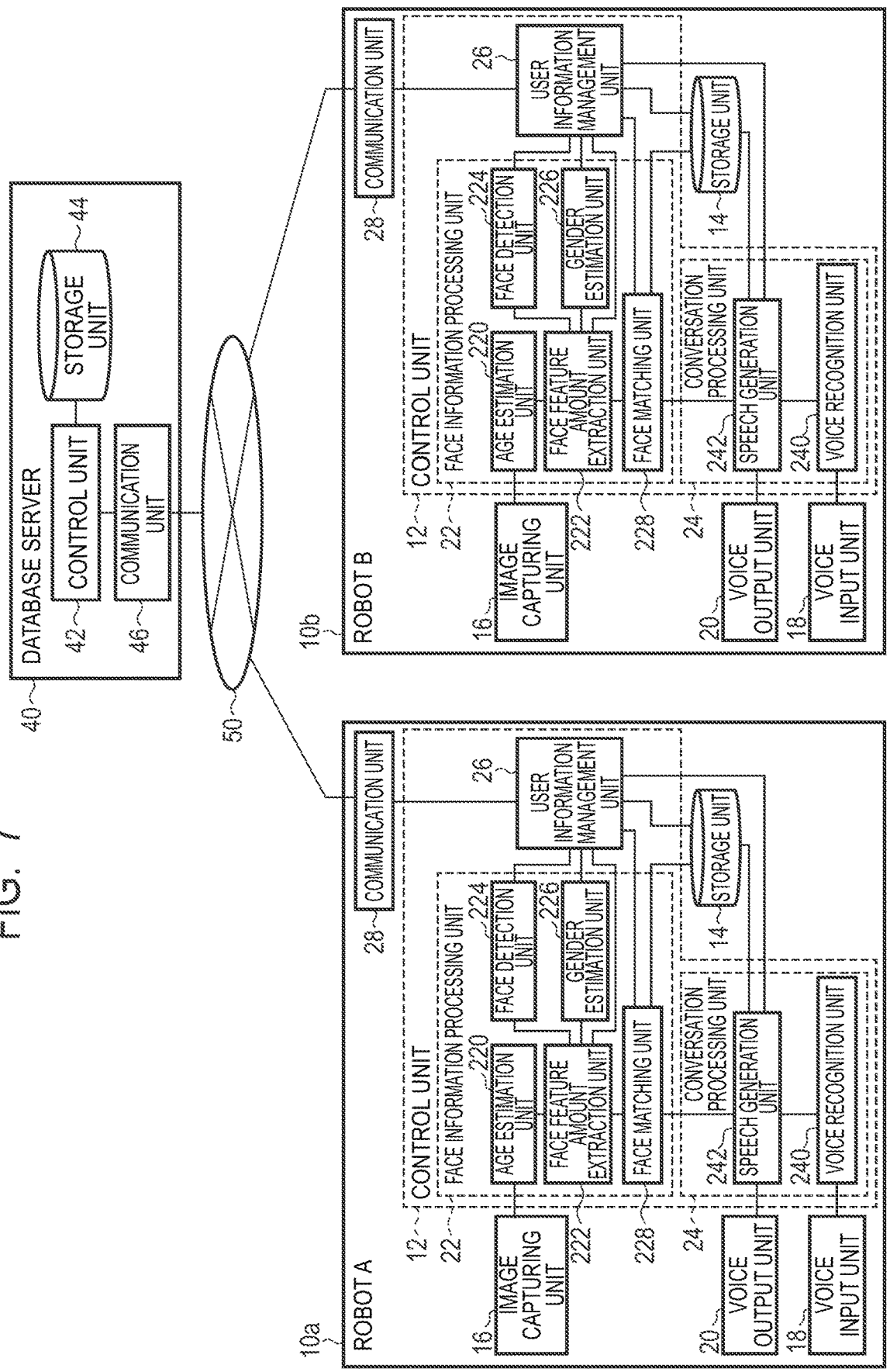
FIG. 7 is a block diagram illustrating a functional configuration of the reception system according to the second example embodiment of the present invention.
Figure 9:
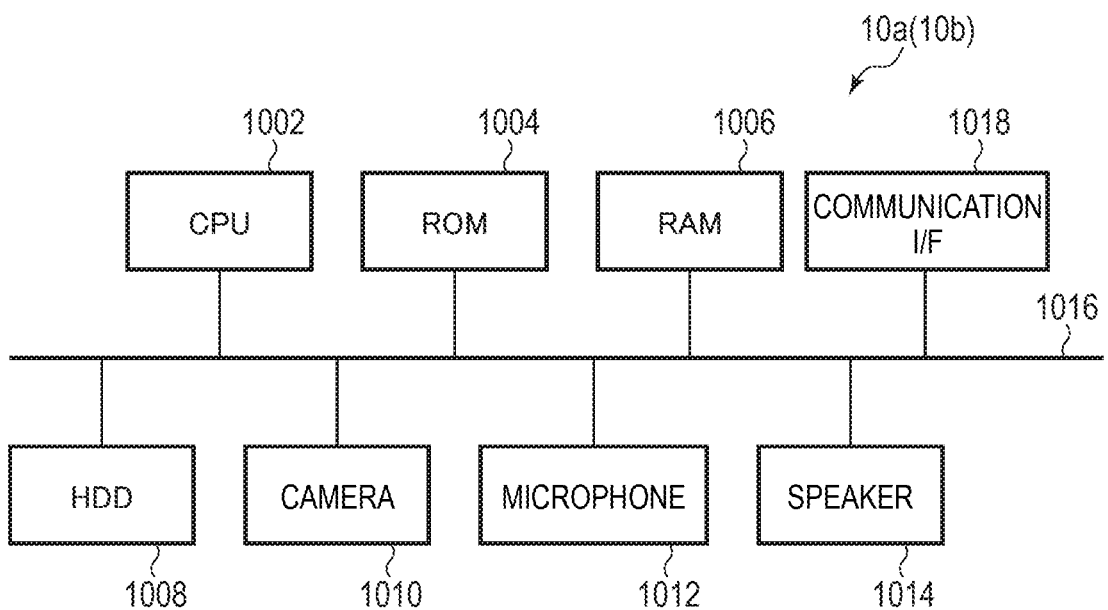
FIG. 9 is a block diagram illustrating an example of a hardware configuration of the reception robot according to the second example embodiment of the present invention.
Figure 10:
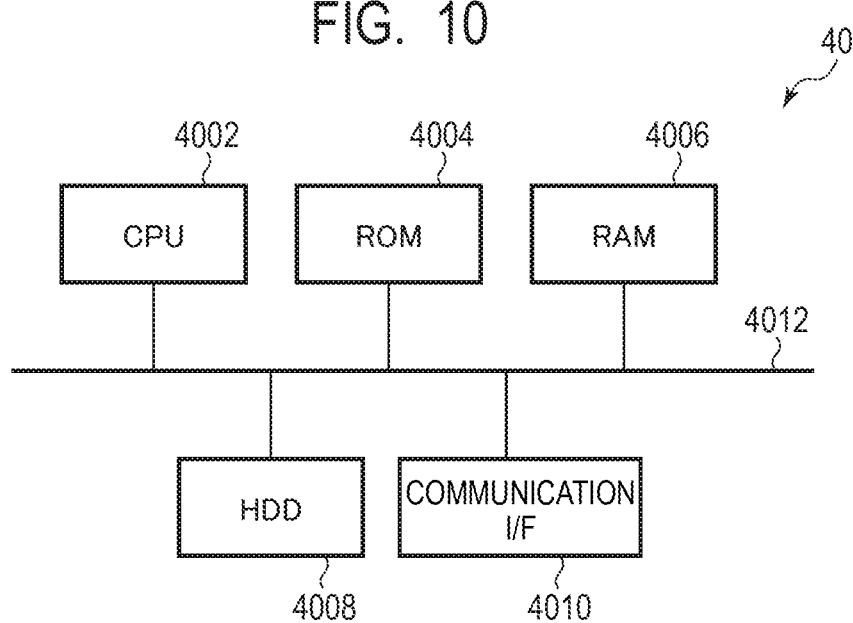
FIG. 10 is a block diagram illustrating an example of a hardware configuration of a database server according to the second example embodiment of the present invention.

First, the reception system according to the present example embodiment will be described by using FIG. 6 to FIG. 10. FIG. 6 is a schematic diagram illustrating a reception system according to the present example embodiment. FIG. 7 is a block diagram illustrating a functional configuration of the reception system according to the present example embodiment. FIG. 8A, FIG. 8B, and FIG. 8C are schematic diagrams illustrating examples of a user information DB stored in a storage unit of respective units in the reception system according to the present example embodiment. FIG. 9 is a block diagram illustrating an example of a hardware configuration of the reception robot according to the present example embodiment. FIG. 10 is a block diagram illustrating an example of a hardware configuration of a database server according to the present example embodiment.

As illustrated in FIG. 6 and FIG. 7, a reception system 30 according to the present example embodiment includes a robot A10a, a robot B10b, and a database (DB) server 40. Each of the robot A10a and the robot B10b is deployed in a shop and attends a user to wait on customers, for example, in the same manner as the robot 10 according to the first example embodiment. The robot A10a and the robot B10b are deployed in shops that are different from each other but owned by the same company, for example. Further, the DB server 40 is deployed in a datacenter located in a different place from the shops where the robot A10a and the robot B10b are deployed, for example. Note that the number of robots is not limited to two of the robot A10a and the robot B10b but may be three or more.

The robot A10a, the robot B10b, and the DB server 40 are connected to the network 50, respectively. The robot A10a and the DB server 40 are able to communicate with each other via the network 50. Further, the robot B10b and the DB server 40 are able to communicate with each other via the network 50. While the type of the network 50 is not limited in particular, it may be a Wide Area Network (WAN) or a Local Area Network (LAN), for example.

Each of the robot A10a and the robot B10b has the same basic configuration as that of the robot 10 according to the first example embodiment. Each of the robot A10a and the robot B10b further has a communication unit 28. Each communication unit 28 of the robot A10a and the robot B10b is connected to the network 50 and enables communication between respective robots and the DB server 40. Each storage unit 14 of the robot A10a and the robot B10b functions as a first storage unit that stores a first user information database.

The DB server 40 has a control unit 42, a storage unit 44, and a communication unit 46.

The control unit 42 controls the operation of the DB server 40.

The user information DB to which user information is registered is stored in the storage unit 44. The storage unit 44 of the DB server 40 functions as a second storage unit that stores a second user information database.

The communication unit 46 is connected to the network 60 and enables communication between the DB server 40 and the robots A10a and B10b.

The robot A10a attends a user in the same manner as in the first example embodiment. Thereby, the user information management unit 26 of the robot A10a registers user information of the attended user to the user information DB of the storage unit 14 in the same manner as in the first example embodiment. The robot B10b also attends a user in the same manner as in the first example embodiment. Thereby, the user information management unit 26 of the robot B10b also registers user information of the attended user to the user information DB of the storage unit 14 in the same manner as in the first example embodiment. The registration of user information as used herein may include not only the registration of user information in step S116 of the flowchart illustrated in FIG. 5 but also additional registration of user information in step S124.

Furthermore, in the present example embodiment, in the registration of user information in the robot A10a and the robot B10b, each of the user information management units 26 registers reception robot information as a part of user information in addition to the user information described in the first example embodiment. The reception robot information that is reception apparatus information is information on a robot that attends a user of user information to be registered. Specifically, the reception robot information is information that identifies a robot which performed reception and includes a robot ID that is an ID of a robot which performed reception. Furthermore, the reception robot information may be information that identifies a deployment location of a robot which performed reception and can include a name of a shop in which the robot which performed reception is deployed and a name of a municipality or city, ward, town, or village that is a basic local government and a name of an administrative district or prefecture that is a wide-area local government where the shop is located.

Moreover, in the robot A10a, the user information management unit 26 communicates with the DB server 40 via the communication unit 28 and uploads and transmits user information registered in the user information DB of the storage unit 14 to the DB server 40. Further, also in the robot B10b, the user information management unit 26 communicates with the DB server 40 via the communication unit 28 and uploads and transmits user information registered in the user information DB of the storage unit 14 to the DB server 40. In such a way, each of the robot A10a and the robot B10b transmits the user information to the DB server 40. Note that the timings when the robot A10a and the robot B10b upload user information are not limited in particular. The robot A10a and the robot B10b can upload user information regularly or irregularly.

On the other hand, in the DB server 40, the control unit 42 communicates with the robot A10*a* via the communication unit 46 and receives the user information transmitted from the robot A10*a*. Further, the control unit 42 communicates with the robot A10*a* via the communication unit 46 and receives the user information transmitted from the robot A10*a*.

Moreover, the control unit 42 registers the user information received from the robot A10*a* and the robot B10*b* to the user information DB of the storage unit 44. Thereby, the control unit 42 updates the user information DB of the storage unit 44.

Thus, each user information management unit 26 in the robot A10*a* and the robot B10*b* registers the user information acquired by each robot itself to the user information DB of the DB server 40 via the network 50.

FIG. 8A, FIG. 8B, and FIG. 8C are schematic diagrams illustrating examples of the user information DB stored in the storage unit of respective units in the reception system 30 according to the present example embodiment. FIG. 8A is a schematic diagram illustrating an example of the user information DB stored in the storage unit 14 of the robot A10*a*. FIG. 8B is a schematic diagram illustrating an example of the user information DB stored in the storage unit 14 of the robot B10*b*. FIG. 8C is a schematic diagram illustrating an example of the user information DB stored in the storage unit 44 of the DB server 40.

As illustrated in FIG. 8A, in the record of the user information DB of the robot A10*a*, the face feature amount, the estimated age, the estimated gender, the conversation history, and the reception date and time acquired for the user are registered as user information in association with the anonymous ID. Moreover, in the record of the user information DB of the robot A10*a*, a reception robot ID is registered, in association with the anonymous ID, as reception robot information indicating that the robot which attended the user is the robot A10*a*.

As illustrated in FIG. 8B, in the record of the user information DB of the robot B10*b*, the face feature amount, the estimated age, the estimated gender, the conversation history, and the reception date and time acquired for the user are registered as user information in association with the anonymous ID. Moreover, in the record of the user information DB of the robot B10*b*, a reception robot ID is registered, in association with the anonymous ID, as reception robot information indicating that the robot which attended the user is the robot B10*b*.

The user information DB of the DB server 40 is constructed by uploading of the user information registered to each user information DB of the robot A10*a* and the robot B10*b* described above. Thus, the user information DB of the DB server 40 includes the record of the user information DB of the robot A10*a* and the record of the user information DB of the robot B10*b*, as illustrated in FIG. 8C.

Each of the robot A10*a* and the robot B10*b* attends a user according to a flowchart illustrated in FIG. 5 in the same manner as in the first example embodiment except for the feature regarding the user information DB used in acquisition of the user information used for searching for the same person and providing a personal conversation.

In the present example embodiment, the robot A10*a* and the robot B10*b* select the user information DB used for search for the same person in step S112 and acquisition of the user information in step S120 illustrated in FIG. 5 in accordance with the quality of communication environment with the DB server 40. In selecting the user information DB, the robot A10*a* and the robot B10*b* select any one of its own user information DB and the user information DB of the DB server 40. Each control unit 12 of the robot A10*a* and the robot B10*b* monitors the communication rate with the DB server 40 and can determine the quality of communication environment with the DB server 40 based on the communication rate with the DB server 40.

For example, when the communication environment between the robot A10*a* and the DB server 40 is good, the robot A10*a* uses the user information DB stored in the storage unit 44 of the DB server 40 as the user information DB. In this case, in step S112, the face matching unit 228 in the robot A10*a* searches for the same person as the user being attended out of users registered in the user information DB stored in the storage unit 44 of the DB server 40. Further, in this case, the speech generation unit 242 in the robot A10*a* acquires the user information of the user found as the same person from the user information DB stored in the storage unit 44 of the DB server 40 in step S120. The face matching unit 228 and the speech generation unit 242 can access the user information DB of the DB server 40 via the communication unit 28 and use that user information DB, respectively.

On the other hand, when the communication environment between the robot A10*a* and the DB server 40 is not good, the robot A10*a* uses the user information DB stored in its own storage unit 14 as the user information DB. In this case, in step S112, the face matching unit 228 in the robot A10*a* searches for the same person as the user being attended out of users registered in the user information DB stored in its own storage unit 14. Further, in this case, the speech generation unit 242 in the robot A10*a* acquires the user information of the user found as the same person from the user information DB stored in its own storage unit 14 in step S120.

The robot B10*b* can select a user information DB in accordance with the quality of communication environment with the DB server 40 in the same manner as the case of the robot A10*a* described above.

As described above, the user information DB of the DB server 40 includes the record of the user information DB of the robot A10*a* and the record of the user information DB of the robot B10*b*. That is, when viewed from each of the robot A10*a* and the robot B10*b*, the user information DB of the DB server 40 includes not only the user information acquired by each robot itself, namely, each apparatus itself but also the user information acquired by another robot, namely, another apparatus. By using such a user information DB of the DB server 40, it is possible to search more pieces of user information for the same person as the user being attended. Further, since user information acquired by another robot may also be utilized to have conversation with the user, this can increase the opportunity of providing a personal conversation in accordance with the user.

Further, as described above, the robot A10*a* and the robot B10*b* select and use any one of its own user information DB and the user information DB of the DB server 40 in accordance with the communication environment. Therefore, the robot A10*a* and the robot B10*b* can use its own user information DB to naturally provide a personal conversation in accordance with the user even when the communication environment is not good.

As discussed above, according to the present example embodiment, since the user information DB of the DB server 40 further including user information acquired by another robot can be used, this can increase the opportunity of providing a personal conversation in accordance with the user. Further, according to the present example embodiment, since any one of the user information DB of each robot itself and the user information DB of the DB server 40 is selected and used in accordance with communication environment, it is possible to naturally provide a personal conversation in accordance with the user regardless of the quality of communication environment.

Note that each of the robot A10a and the robot B10b described above is formed of a computer apparatus, for example. The hardware configuration of the robot A10a and the robot B10b is substantially the same as the hardware configuration according to the first example embodiment illustrated in FIG. 4. Each of the robot A10a and the robot B10b further has a communication I/F 1018 that implements the function of the communication unit 28, as illustrated in FIG. 9.

The communication I/F 1018 is connected to the network 50. The communication I/F 1018 controls data communication with the DB server 40 connected to the network 50.

Further, the DB server 40 described above is formed of a computer apparatus, for example. An example of the hardware configuration of the DB server 40 will be described by using FIG. 10. Note that the DB server 40 may be formed of a single apparatus or may be formed of two or more physically separated apparatuses coupled to each other through wired or wireless connection.

The DB server 40 has a CPU 4002, a ROM 4004, a RAM 4006, and an HDD 4008, as illustrated in FIG. 10. Further, the DB server 40 has a communication I/F 4010. The CPU 4002, the ROM 4004, the RAM 4006, the HDD 4008, and the communication I/F 4010 are connected to a common bus line 4012.

The CPU 4002 controls the entire operation of the DB server 40. Further, the CPU 4002 executes a program implementing the function of the control unit 42 described above. The CPU 4002 implements the function of the control unit 42 by loading the program stored in the HDD 4008 or the like to the RAM 4006 and executing it.

The ROM 4004 stores a program such as a boot program therein. The RAM 4006 is used as a working area when the CPU 4002 executes a program. Further, the HDD 4008 stores a program executed by the CPU 4002.

Further, the HDD 4008 is a storage apparatus that implements the function of the storage unit 44 described above. Note that a storage apparatus that implements the function of the storage unit 44 is not limited to the HDD 4008. Various storage apparatuses can be used for implementing the function of the storage unit 44.

The communication I/F 4010 is connected to the network 50. The communication I/F 4010 controls data communication with the robot A10a and the robot B10b connected to the network 50.

Note that the hardware configuration of the DB server 40 is not limited to the configuration described above, and various configurations may be employed.

Third Example Embodiment

A reception system and a reception method according to a third example embodiment of the present invention will be described by using FIG. 11. Note that the same components as those in the reception system and the reception method according to the second example embodiment described above are labeled with the same reference numerals, and the description thereof will be omitted or simplified.

The basic configuration of the reception system according to the present example embodiment is the same as the configuration of the reception system according to the second example embodiment described above. In the reception system according to the present example embodiment, each of the robot A10a and the robot B10b updates the user information DB stored in its own storage unit 14 in synchronization with the user information DB stored in the storage unit 44 of the DB server 40.

The synchronization of the user information DB in the reception system according to the present example embodiment will be described below by using FIG. 11. FIG. 11 is a sequence diagram illustrating synchronization of the user information DB in the reception system according to the present example embodiment.

Figure 11:
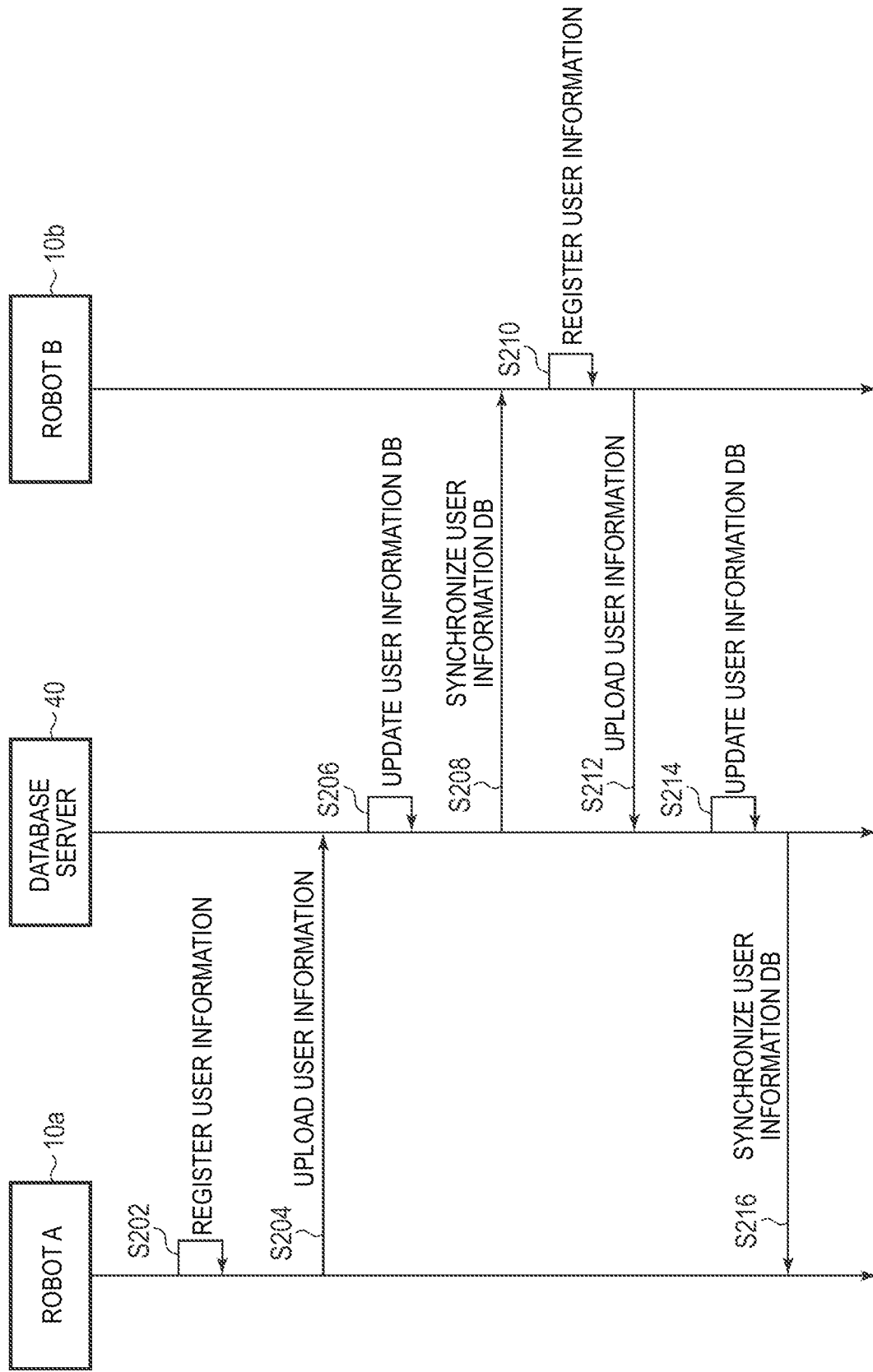
FIG. 11 is a sequence diagram illustrating synchronization of a user information database in a reception system according to a third example embodiment of the present invention.

As illustrated in FIG. 11, the robot A10a attends the user in the same manner as in the second example embodiment. Accordingly, the user information management unit 26 of the robot A10a registers user information to the user information DB of the storage unit 14 in the same manner as in the second example embodiment (step S202). Note that the registration of the user information as used herein may include not only the registration of user information in step S116 but also additional registration of user information in step S124 of the flowchart illustrated in FIG. 5.

Moreover, in the robot A10a, the user information management unit 26 communicates with the DB server 40 via the communication unit 28 and uploads the user information registered in the user information DB of the storage unit 14 to the DB server 40 (step S204).

In the DB server 40, the control unit 42 registers the user information received from the robot A10a to the user information DB of the storage unit 44. Thereby, the control unit 42 updates the user information DB of the storage unit 44 (step S206).

On the other hand, in the robot B10b, the user information management unit 26 synchronizes the user information DB of the storage unit 14 with the user information DB of the DB server 40 (step S208). Thereby, the user information management unit 26 of the robot B10b updates the content of the user information DB of the storage unit 14 to the same content as the content of the user information DB of the DB server 40.

Further, the robot B10b attends the user in the same manner as the second example embodiment. The user information management unit 26 of the robot B10b registers user information to the user information DB of the storage unit 14 in the same manner as in the second example embodiment (step S210). Note that the registration of the user information as used herein may include not only the registration of user information in step S116 but also additional registration of user information in step S124 of the flowchart illustrated in FIG. 5.

Moreover, in the robot B10b, the user information management unit 26 communicates with the DB server 40 via the communication unit 28 and uploads the user information registered in the user information DB of the storage unit 14 to the DB server 40 (step S212).

In the DB server 40, the control unit 42 registers the user information received from the robot B10b to the user information DB of the storage unit 44. Thereby, the control unit 42 updates the user information DB of the storage unit 44 (step S214).

On the other hand, in the robot A10a, the user information management unit 26 synchronizes the user information DB of the storage unit 14 with the user information DB of the DB server 40 (step S216). Thereby, the user information management unit 26 of the robot A10a updates the content of the user information DB of the storage unit 14 to the same content as the content of the user information DB of the DB server 40.

In such a way, in each of the robot A10a and the robot B10b, the user information DB is synchronously updated. Thereby, the content of the user information DB in each robot becomes the same content as the content of the user information DB of the DB server 40 further including the user information acquired by another robot.

In the reception system according to the present example embodiment, upload of user information by the robot A10a and the robot B10b, update of the user information DB in the DB server 40, and synchronous update of the user information DB in the robot A10a and robot B10b are repeated. Note that the timings of upload of user information according to the robot A10a and the robot B10b are not limited in particular, and user information can be uploaded regularly or irregularly. Further, the timing of update of the user information DB in the DB server 40 is not limited in particular, and the user information DB can be updated regularly or irregularly. Further, the timings of synchronous update of the user information DB in the robot A10a and the robot B10b are not limited in particular, and the user information DB can be synchronously updated regularly or irregularly.

Each of the robot A10a and the robot B10b can use its own user information DB synchronously updated as described above to search for the same person in step S112 and acquire the user information in step S120 illustrated in FIG. 5.

Each user information DB of the robot A10a and the robot B10b synchronously updated as described above includes the user information acquired by the robot A10a and the user information acquired by the robot B10b. That is, the synchronously updated user information DB of each robot includes not only the user information acquired by each robot itself but also the user information acquired by another robot. With the use of such a user information DB of the robot, it is possible to search more pieces of user information for the same person as the user being attended. Further, since the user information acquired by another robot can also be utilized to have conversation with the user, this can increase the opportunity of providing a personal conversation in accordance with the user.

Further, since the user information DB of the robot itself further including the user information acquired by another robot in synchronous update is used, unlike the case where the user information DB of the DB server 40 is used, the operation is not affected by the communication environment.

As discussed above, according to the present example embodiment, since the user information DB of the robot itself further including the user information acquired by another robot in synchronous update is used, this can increase the opportunity of providing a personal conversation in accordance with the user.

Fourth Example Embodiment

A reception system and a reception method according to the fourth example embodiment of the present invention will be described by using FIG. 12 to FIG. 14. Note that the same components as those in the reception system and the reception method according to the second and third example embodiments described above are labeled with the same reference numerals, and the description thereof will be omitted or simplified.

The basic configuration of the reception system according to the present example embodiment is the same as the configuration of the reception system according to the second example embodiment described above. In the present example embodiment, a reception method when the user information DB of the DB server 40 including not only user information acquired by each robot itself but also user information acquired by another robot is used to attend the user will be described in detail.

The reception method according to the present example embodiment will be described below by using FIG. 12 to FIG. 14. FIG. 12 is a schematic diagram illustrating an example of the user information DB in the reception system according to the present example embodiment. FIG. 13 and FIG. 14 are flowcharts illustrating the reception method according to the present example embodiment.

FIG. 12 illustrates an example of the user information DB of the DB server 40. As illustrated in FIG. 12, the user information DB of the DB server 40 includes user information acquired by the robot A10a and user information acquired by the robot B10b. Moreover, the user information DB of the DB server 40 includes user information acquired by another robot C that is the same as the robot A10a and the robot B10b.

Each user information acquired by each robot includes, as reception robot information, a name of a shop in which the robot which performed reception is deployed and a name of a municipality that is a basic local government and a name of an administrative district that is a wide-area local government where the shop is located, in addition to a reception robot ID.

Each robot uses the user information DB of the DB server 40 as described above to attend a user. A case where reception is performed by the robot A10a will be described below as an example.

Figure 13:
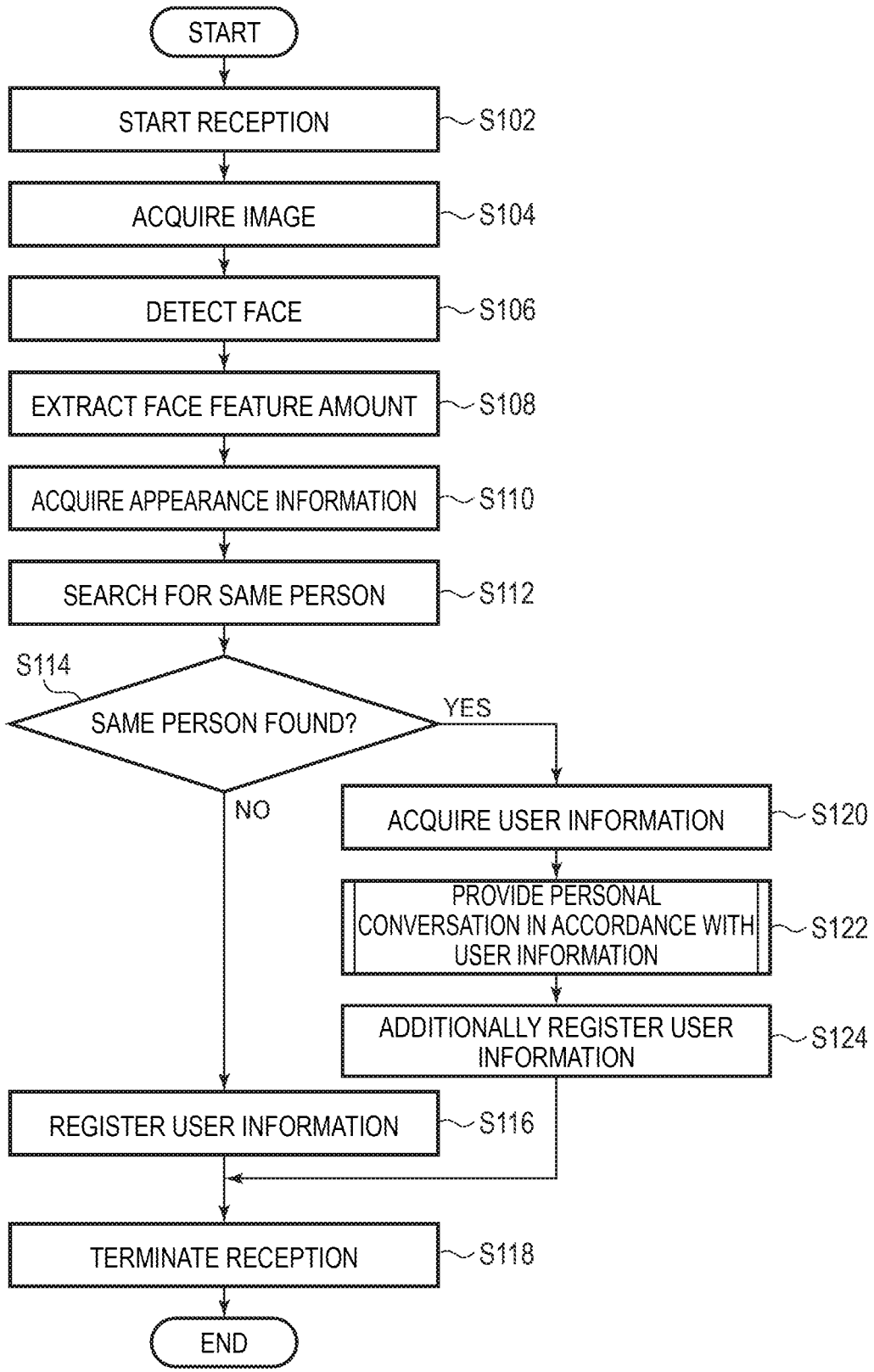
FIG. 13 is a flowchart (part 1) illustrating a reception method according to the fourth example embodiment of the present invention.
Figure 14:
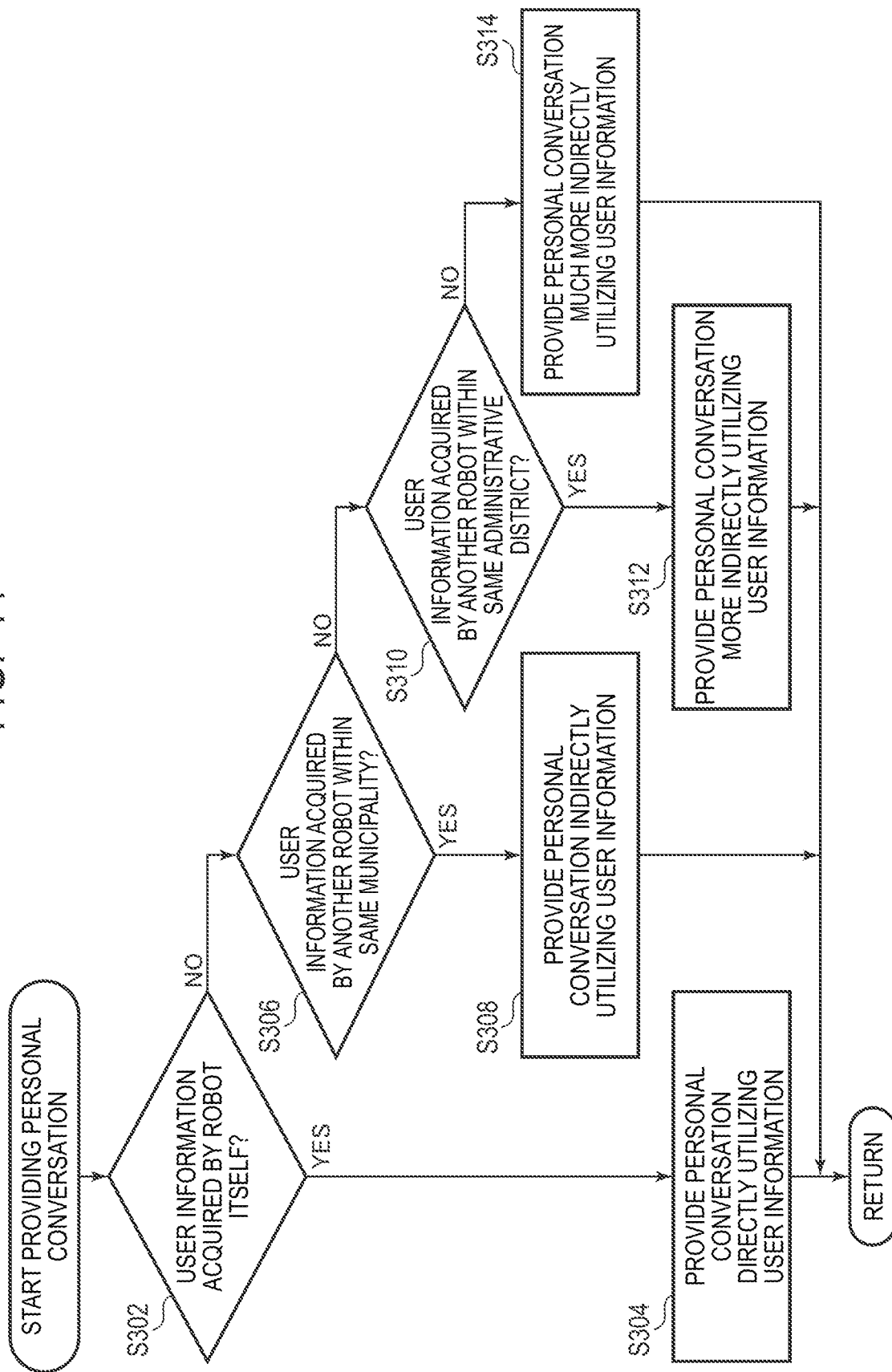
FIG. 14 is a flowchart (part 2) illustrating the reception method according to the fourth example embodiment of the present invention.

The robot A10a attends the user according to the flowchart illustrated in FIG. 13. The flowchart illustrated in FIG. 13 is basically the same as the flowchart illustrated in FIG. 5 of the first example embodiment. However, the robot A10a uses the user information DB of the DB server 40 as the user information DB used in searching for the same person in step S112. Further, the robot A10a uses the user information DB of the DB server 40 as the user information DB used in acquiring the user information in step S120.

In searching for the same person in step S112, the face matching unit 228 of the robot A10a determines a search priority for user information of the user information DB based on the reception robot information included in the user information of the user information DB of the DB server 40. The face matching unit 228 sequentially matches face feature amounts of user information in descending order of the search priority according to the level of the determined search priority. With a search priority being determined in such a way, searching for the same person can be efficiently performed.

Specifically, the face matching unit 228 of the robot A10a sets the highest search priority for the user information acquired by the robot itself, that is, by the robot A10a out of the user information registered in the user information DB of the DB server 40, for example. Further, the face matching unit 228 sets the second highest search priority for the user information acquired by a robot which is a different robot than the robot A10a and deployed in the same shop out of the user information of the user information DB. Further, the face matching unit 228 sets the third highest search priority for the user information acquired by a robot which is a different robot than the robot A10a and deployed in another shop within the same municipality out of the user information of the user information DB. Further, the face matching unit 228 sets the fourth highest search priority for the user information acquired by a robot which is a different robot than the robot A10*a* and deployed in another shop within the same administrative district but not within the same municipality.

In such a way, for user information acquired by other robots than the robot A10*a*, the face matching unit 228 of the robot A10*a* can determine a search priority based on the distance relationship or the geographical relationship between the other robot and the robot A10*a*. Specifically, the face matching unit 228 of the robot A10*a* can determine a search priority for the user information acquired by other robots based on the distance relationship between the deployment location of other robots and the deployment location of the robot A10*a*.

As discussed above, the face matching unit 228 of the robot A10*a* can set the search priority of the user information acquired by the robot itself to be higher than the search priority of the user information acquired by the other robots. Further, for the user information acquired by the other robots than the robot A10*a*, the face matching unit 228 of the robot A10*a* can determine a search priority based on the distance relationship or the geographical relationship between the other robots and the robot A10*a*.

Further, in the present example embodiment, when providing a personal conversation in step S122, the speech generation unit 242 takes into consideration of the reception robot information of the user information utilized for the conversation. Details of providing a personal conversation in step S122 in the present example embodiment will be described below by using FIG. 14. FIG. 14 is a flowchart illustrating details of having a personal conversation in step S122 in the present example embodiment.

First, the speech generation unit 242 of the robot A10*a* determines whether or not the user information acquired from the user information DB in step S120 is acquired by the robot A10*a*, that is, whether or not acquired by itself (step S302).

If the user information is information acquired by the robot itself (step S302, YES), the speech generation unit 242 of the robot A10*a* directly utilizes the user information acquired in step S120 and generates text data forming a personal conversation by using a speech engine. Moreover, the speech generation unit 242 generates audio data corresponding to the generated text data. The audio data generated by the speech generation unit 242 is output as a voice from the voice output unit 20 to the user. Note that a plurality of robots may be deployed in the same location such as in the same shop, there may be a case where the user information in which matching of the face feature amount is matched is information acquired by another robot deployed in the same location. Also in this case, the speech generation unit 242 can directly utilize the user information acquired by another robot deployed in the same location and generate text data forming a personal conversation by using a speech engine in the same manner as the case where the user information is information acquired by the robot itself.

In such a way, the robot A10*a* directly utilizes the user information acquired by itself and has a personal conversation with the user (step S304). For example, it is assumed that a conversation history having a conversation content to the effect that the user's birthday is April 2 is included in the user information acquired by the robot itself. In this case, when the date of reception is close to April 2, the robot A10*a* can perform utterance of "By the way, your birthday is coming soon, right?", for example. By directly utilizing user information acquired by the robot itself in such a way, it is possible to provide a personal conversation which is directly related to the conversation content in the conversation history or a personal conversation highly related to the conversation content in the conversation history. Further, a user who has a personal conversation with the robot A10*a* is likely to recognize that the user has conversed with the robot A10*a* in the past. Thus, even when a personal conversation directly related to the content in the conversation history is provided, the user is less likely to feel unnatural or strange with the content of the conversation.

In such a way, the speech generation unit 242 of the robot A10*a* changes the content of a personal conversation with the user in accordance with whether the robot identified by the reception apparatus information included in the user information in which matching of the face feature amount is matched is the robot itself or another robot. Note that, when the robot identified by the reception apparatus information is another robot, the content of a personal conversation with the user will be as described below.

On the other hand, if the user information is not information acquired by the robot itself, that is, if it is information acquired by another robot (step S302, NO), the speech generation unit 242 of the robot A10*a* determines the distance relationship or the geographical relationship between the robot A10*a* and another robot. The speech generation unit 242 of the robot A10*a* changes the content of a personal conversation using the user information acquired by another robot in accordance with the determined distance relationship or geographical relationship. Note that, specifically, the distance relationship or the geographical relationship as used herein refers to a distance relationship between the deployment location of the robot A10*a* and the deployment location of another robot, for example.

Specifically, the speech generation unit 242 of the robot A10*a* determines whether or not the user information acquired from the user information DB in step S120 is information acquired in another robot within the same municipality, for example (step S306).

If the user information is information acquired by another robot within the same municipality (step S306, YES), the speech generation unit 242 of the robot A10*a* indirectly utilizes the user information acquired in step S120. That is, the speech generation unit 242 indirectly utilizes the user information acquired in step S120 and generates text data forming a personal conversation by using a speech engine. Moreover, the speech generation unit 242 generates audio data corresponding to the generated text data. The audio data generated by the speech generation unit 242 is output as a voice from the voice output unit 20 to the user.

In such a way, the robot A10*a* indirectly utilizes the user information acquired by another robot within the same municipality to have a personal conversation with the user (step S308). For example, it is assumed that a conversation history of the conversation content to the effect that the user likes yellow is included in the user information acquired in another robot within the same municipality. In this case, while presenting yellow clothes, the robot A10*a* can provide utterance of "Clothes here are in fashion. How are them?" for example. By indirectly utilizing user information acquired by another robot in such a way, it is possible to provide a personal conversation with a content diluting relevance with the conversation content in the conversation history. The content of a personal conversation indirectly utilizing user information acquired by another robot may have lower relevance to the conversation content in the conversation history compared to the content of a personal conversation directly utilizing user information acquired by the robot itself.

If the user information is not information acquired by another robot within the same municipality (step S306, NO), the speech generation unit 242 of the robot A10a further determines the distance relationship or the geographical relationship. That is, the speech generation unit 242 of the robot A10a determines whether or not the user information acquired from the user information DB in step S120 is one acquired by another robot within the same municipality (step S310).

If the user information is information acquired by another robot within the same municipality (step S310, YES), the speech generation unit 242 of the robot A10a more indirectly utilizes the user information acquired in step S120. That is, the speech generation unit 242 more indirectly utilizes the user information acquired in step S120 and generates text data forming a personal conversation by using a speech engine. Moreover, the speech generation unit 242 generates audio data corresponding to the generated text data. The audio data generated by the speech generation unit 242 is output as a voice from the voice output unit 20 to the user.

In such a way, the robot A10a more indirectly utilizes the user information acquired by another robot within the same administrative district but not within the same municipality and has a personal conversation with the user (step S312). For example, it is assumed that a conversation history of a conversation content to the effect that the user likes travelling is included in the user information acquired in another robot within the same administrative district but not within the same municipality. In this case, the robot A10a can provide utterance of "It's getting warm. You may feel like going somewhere," for example. By more indirectly utilizing user information acquired by another robot in such a way, it is possible to have a personal conversation with a content further diluting relevance with the conversation content in the conversation history. The content of a personal conversation more indirectly utilizing user information acquired by another robot may have lower relevance to the conversation content in the conversation history compared to the content of a personal conversation indirectly utilizing user information acquired by another robot.

If the user information is not information acquired by another robot within the same administrative district (step S330, NO), the speech generation unit 242 of the robot A10a much more indirectly utilizes the user information acquired in step S120. That is, the speech generation unit 242 much more indirectly utilizes the user information acquired in step S120 and generates text data forming a personal conversation by using a speech engine. Moreover, the speech generation unit 242 generates audio data corresponding to the generated text data. The audio data generated by the speech generation unit 242 is output as a voice from the voice output unit 20 to the user.

In such a way, the robot A10a much more indirectly utilizes the user information acquired by another robot inside or outside the same administrative district and has a personal conversation with the user (step S314). Further, in this case, a general conversation may be provided to the user without a use of the user information acquired by another robot inside or outside the same administrative district. By much more indirectly utilizing user information acquired by another robot in such a way, it is possible to have a personal conversation with a content much more diluting relevance with the conversation content in the conversation history. The content of a personal conversation much more indirectly utilizing user information acquired by another robot may have lower relevance to the conversation content in the conversation history compared to the content of a personal conversation more indirectly utilizing user information acquired by another robot.

In such a way, when the robot identified by the reception robot information included in the user information in which matching of the face feature amount is matched is another robot, the speech generation unit 242 of the robot A10a changes the content of a personal conversation with the user in accordance with the determined distance relationship or geographical relationship between another robot and the robot itself.

As described above, when user information acquired by another robot is utilized to provide a personal conversation, relevance to the conversation content in the conversation history is diluted in the content of the personal conversation. It is therefore possible to reduce awkwardness or uncomfortable feeling at a user to the contents of a personal conversation and further avoid awkwardness or uncomfortable feeling.

As discussed above, according to the present example embodiment, since the conversation content of a personal conversation is changed in accordance with reception robot information included in user information used for providing the personal conversation, the personal conversation can be more naturally provided.

Note that, while the case of using the user information DB of the DB server 40 has been described above, the same process may apply to the case where the user information DB of the robot itself synchronously updated to the same content as that in the user information DB of the DB server 40 is used as illustrated in the third example embodiment.

Fifth Example Embodiment

A computer apparatus according to a fifth example embodiment of the present invention will be described by using FIG. 15. In the present example embodiment, a computer apparatus used for implementing the process of respective units in the reception robot and the reception system according to the first to fourth example embodiments described above will be described.

Figure 15:
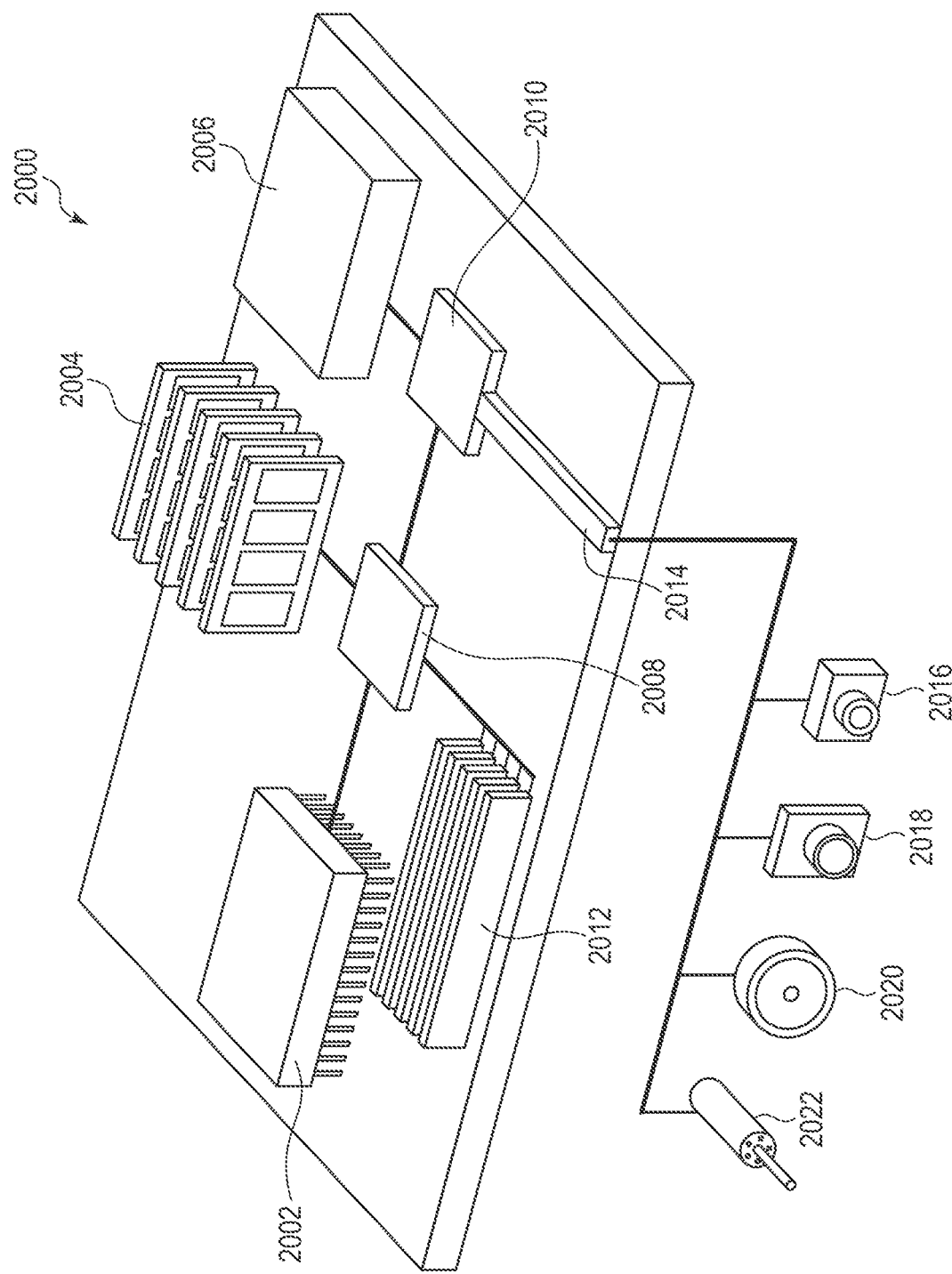
FIG. 15 is a schematic diagram illustrating an example of a computer apparatus according to a fifth example embodiment of the present invention.

FIG. 15 illustrates an example of a computer apparatus used for implementing the process of respective units in the reception robot and the reception system according to the first to fourth example embodiment described above. A computer apparatus 2000 illustrated in FIG. 15 is not limited in particular but may be of any type or any form. For example, the computer apparatus 2000 may be a laptop computer, a desktop computer, a workstation, a personal digital assistant, a server, a blade server, a mainframe, an embedded system, or the like. For example, the computer apparatus 2000 can be mounted on the robot 10 as an embedded system.

The computer apparatus 2000 has a processor 2002, memory 2004, and a storage apparatus 2006. Further, the computer apparatus 2000 has a high speed controller 2008 including a high speed interface and a low speed controller 2010 including a low speed interface. The memory 2004 and a high speed extension port 2012 are connected to the high speed controller 2008. Further, an external input/output apparatus such as a display is connected to the high speed controller 2008. On the other hand, a low speed extension port 2014 and the storage apparatus 2006 are connected to the low speed controller 2010.

When the computer apparatus 2000 is used for implementing the process of respective units in the robot 10, a camera module 2016, a microphone module 2018, and a speaker module 2020 are connected to the low speed extension port 2014. Furthermore, in this case, an actuator module 2022 is connected to the low speed extension port 2014. The camera module 2016 functions as the image capturing unit 16. The microphone module 2018 functions as the voice input unit 18. The speaker module 2020 functions as the voice output unit 20. The actuator module 2022 functions as a drive unit that drives movable part of the robot 10. Note that these modules may be connected to the high speed extension port 2012.

The processor 2002, the memory 2004, the storage device 2006, the high speed controller 2008, the low speed controller 2010, and the high speed extension port 2012 are connected to each other through various buses. Further, the processor 2002, the memory 2004, the storage device 2006, the high speed controller 2008, the low speed controller 2010, and the high speed extension port 2012 may be implemented on a common motherboard or may be implemented as appropriate in other forms.

The processor 2002 is a CPU, for example, and can process an instruction executed within the computer apparatus 2000. Such an instruction may include an instruction used for displaying graphic information of a graphical user interface (GUI) on an external input/output device such as a display and stored in the memory 2004 or the storage device 2006.

Further, a plurality of processors, a plurality of buses, or a plurality of processors and a plurality of buses can be used as appropriate together with multiple memory devices and multiple types of memory devices. Further, the plurality of computer apparatuses 2000 can be connected to each apparatus that performs some of necessary processes. For example, the plurality of computer apparatuses 2000 can be connected to each other as a server bank, a group of blade servers, or a multi-processor system.

The memory 2004 stores information present in the computer apparatus 2000. For example, the memory 2004 may be a volatile memory unit or a non-volatile memory unit. The memory 2004 may be another computer readable medium and may be a magnetic disk, an optical disk, or the like, for example.

The storage device 2006 can configure mass storage used for the computer apparatus 2000. The storage device 2006 is, for example, a computer readable medium such as a floppy (registered trademark) disk device, a hard disk device, an optical disk device, a tape device, a flash memory or other solid state memory devices, a disk array, or the like. Alternatively, the storage device 2006 can include such a computer readable medium. The storage device 2006 includes a storage area network, or devices of other configurations. A computer program product may be tangibly embodied in an information carrier. The computer program product can store one or more instructions that execute one or a plurality of processes as described above when executed. The information carrier is the memory 2004, the storage device 2006, a memory device on the processor 2002, or a computer readable medium such as a propagation signal or a machine readable medium.

The high speed controller 2008 manages the process that intensively uses a bandwidth for the computer apparatus 2000. On the other hand, the low speed controller 2010 manages the process that less intensively uses the bandwidth. However, such allocation of functions is a mere example and not limited thereto. Further, a part or whole of the high speed controller 2008 may be incorporated in the processor 2002.

The high speed controller 2008 is connected to the memory 2004 and the high speed extension port 2012 that can accept various extension cards. Further, the high speed controller 2008 is connected to an external input/output device such as a display via a graphics processor or an accelerator, for example.

Further, the low speed controller 2010 is connected to the storage device 2006 and the low speed extension port 2014. The low speed extension port 2014 can include a communication port of various standards such as Universal Serial Bus (USB) (registered trademark), wired or wireless Ethernet (registered trademark), or the like, for example. To the low extension port 2014, one or more input/output devices such as a keyboard, a pointing device, a scanner, and the like can be connected. Further, to the low speed extension port 2014, one or more network devices such as a switch, a router, or the like can be connected via a network adapter, for example.

The computer apparatus 2000 can be implemented in a number of different forms. For example, the computer apparatus 2000 can be implemented by a typical server or a grouped form with a plurality of such servers. Further, the computer apparatus 2000 can be implemented as a part of a rack server system. Moreover, the computer apparatus 2000 can be implemented in a form of a personal computer such as a laptop computer, a desktop computer, or the like.

The computer apparatus 2000 described above can function as a part of the robot 10 in the example embodiments described above. In this case, the processor 2002 of the computer apparatus 2000 can function as the control unit 12 by executing a program that implements the function of the control unit 12 of the robot 10. Further, the storage device 2006 of the computer apparatus 2000 can function as the storage unit 14 of the robot 10.

Further, the computer apparatus 2000 can function as the DB server 40 in the example embodiments described above. In this case, the processor 2002 of the computer apparatus 2000 can function as the control unit 42 by executing a program that implements the function of the control unit 42 of the DB server 40. Further, the storage device 2006 of the computer apparatus 2000 can function as the storage unit 44 of the DB server 40.

Note that a part or whole of the program executed by the processor 2002 of the computer apparatus 2000 can be provided by a computer readable storage medium that stores it therein, such as a Digital Versatile Disc-Read Only Memory (DVD-ROM), a Compact Disc-Read Only Memory (CD-ROM), a USB memory or other flash memory, or the like.

Other Example Embodiments

Figure 16:
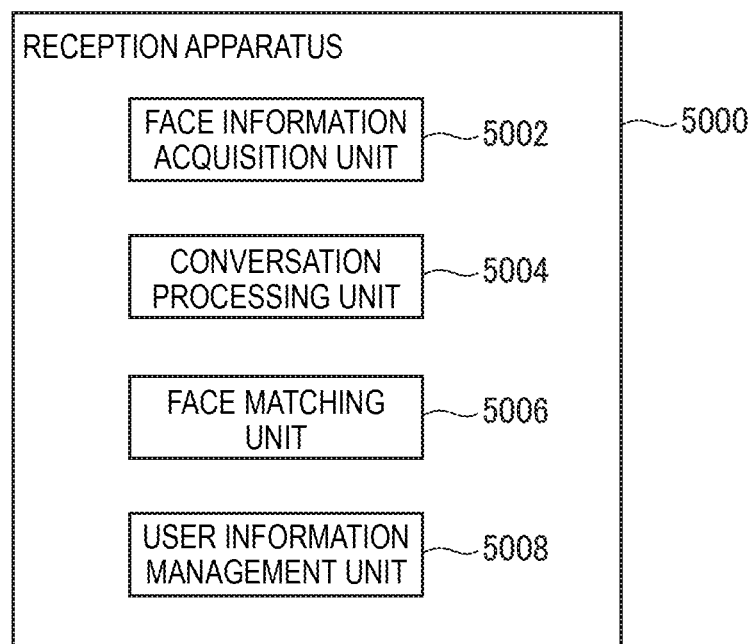
FIG. 16 is a block diagram illustrating a functional configuration of a reception apparatus according to another example embodiment of the present invention.

A reception apparatus that can function as the reception robot described in each of the above example embodiments can be configured as illustrated in FIG. 16 according to another example embodiment. FIG. 16 is a block diagram illustrating a functional configuration of a reception apparatus according to another example embodiment.

As illustrated in FIG. 16, the reception apparatus 5000 according to another example embodiment has a face information acquisition unit 5002 that acquires face information of one user to be attended and a conversation processing unit 5004 that has conversation with the one user and acquires reception information including a content of the conversation. Further, the reception apparatus 5000 has a face matching unit 5006 that matches, against the face information of the one user, face information registered in the user information database in which user information including face information of the attended user and the reception information is registered. Furthermore, the reception apparatus 5000 has a user information management unit 5008 that, when a result of matching of face information performed by the face matching unit 5006 is unmatched, registers the user information of the one user to the user information database.

According to the reception apparatus 5000 of another example embodiment, it is possible to naturally have a personal conversation in accordance with a user without requiring the user to register the personal information thereof in advance.

Figure 17:
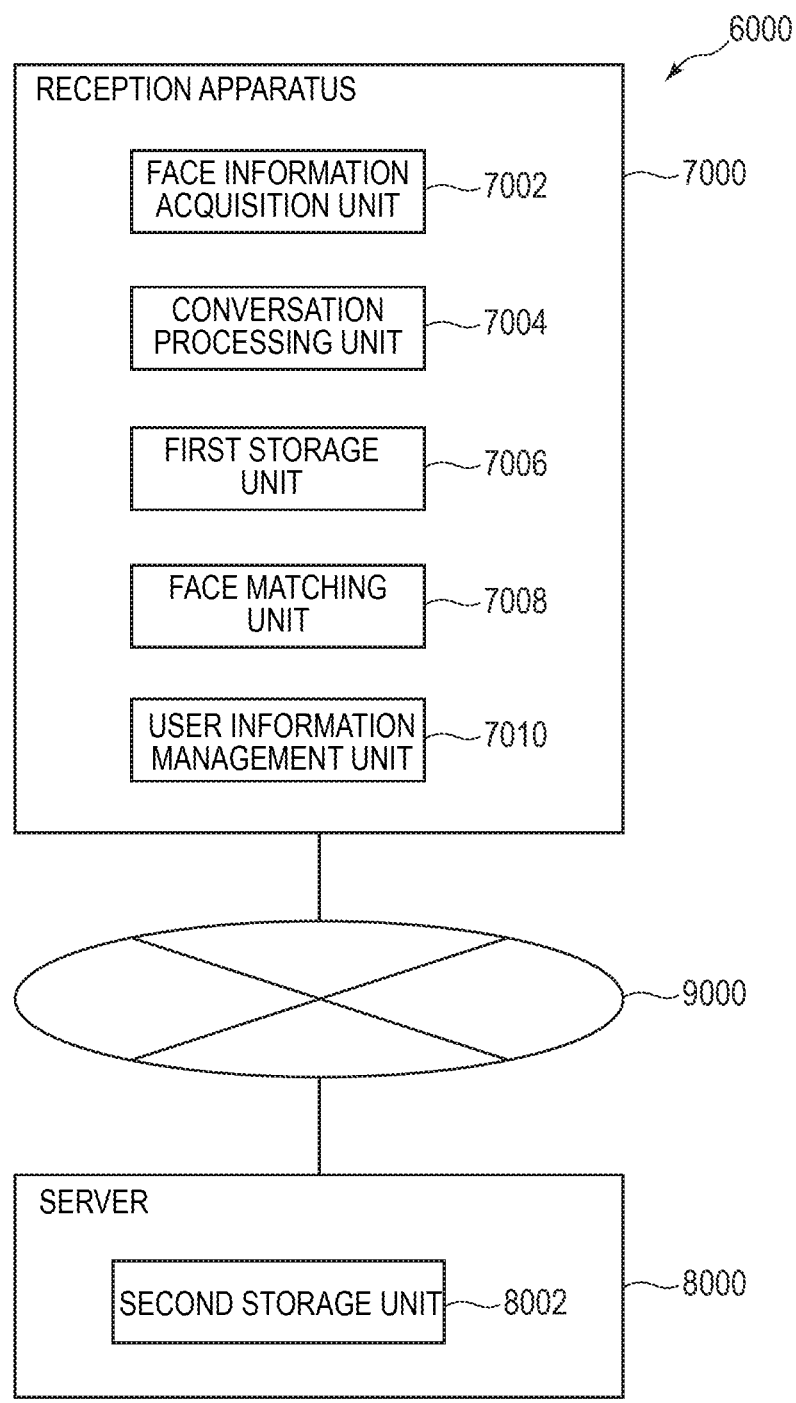
FIG. 17 is a block diagram illustrating a functional configuration of a reception system according to another example embodiment of the present invention.

Further, the reception system described in each of the above example embodiments can be configured as illustrated in FIG. 17 according to another example embodiment. FIG. 17 is a block diagram illustrating a functional configuration of a reception system according to another example embodiment.

As illustrated in FIG. 17, a reception system 6000 according to another example embodiment includes the reception apparatus 7000 and the server 8000. The reception apparatus 7000 and the server 8000 can communicate with each other via a network 9000.

The reception apparatus 7000 has a face information acquisition unit 7002 that acquires face information of a user to be attended and a conversation processing unit 7004 that has conversation with one user and acquires reception information including a content of conversation with the user. Further, the reception apparatus 7000 has a first storage unit 7006 that stores a first user information database. In the first user information database, user information including the face information of the attended user and the reception information is registered. Further, the reception apparatus 7000 has a face matching unit 7008 that matches, against the face information of one user, the face information registered in the first user information database. Furthermore, the reception apparatus 7000 has a user information management unit 7010 that, when a result of matching of the face information performed by the face matching unit 7008 is unmatched, registers the user information of the one user to the first user information database in the first storage unit 7006.

The server 8000 has a second storage unit 8002 that stores a second user information database. In the second user information database, user information including the face information of the user attended by the plurality of reception apparatuses 7000 and the reception information is registered.

The user information management unit 7010 of the reception apparatus 7000 synchronizes the first user information database with the second user information database. Thereby, the user information management unit 7010 updates a content of the first user information database to the same content as a content of the second user information database.

According to the reception system 6000 of another example embodiment, it is possible to naturally have a personal conversation in accordance with a user without requiring the user to register the personal information thereof in advance.

Modified Example Embodiments

The present invention is not limited to the example embodiments described above, and various modifications are possible.

For example, while the robot 10, the robot A10a, and the robot B10b have been described as an example of the reception apparatus that performs reception in the above example embodiments, the reception apparatus is not necessarily required to be a robot. The reception apparatus may be an apparatus such as a smartphone, a tablet terminal, a computer terminal, or the like in addition to the robot that can attend a user.

Further, the case where the robot 10, the robot A10a, and the robot B10b are deployed in shops has been described as an example in the above example embodiments, a place where each robot is deployed is not limited to a shop. The robot can be deployed in any place in addition to a shop that is visited by a user who may need reception.

Further, while the case where an estimated age or an estimated gender is acquired and registered as user information from a user image captured by the image capturing unit 16 has been described as an example in the above example embodiments, other information may be acquired and registered as user information. For example, clothing information on user's clothes, the number of accompanying persons with a user, the weather at a place where a user is located, or place information on a condition of a place such as a congestion degree can be acquired and registered as user information from a user image captured by the image capturing unit 16.

Further, while the case where each of the robot 10, the robot A10a, and the robot B10b have conversation with a user by utterance has been described as an example in the above example embodiments, each robot is not limited to that speaks only. The robot may be configured to move or travel in accordance with the content of conversation with a user or the like, in addition to speech.

Further, while the case where each of the robot 10, the robot A10a, and the robot B10b have conversation with a user by voice has been described as an example in the above example embodiments, each robot is not limited to that provides conversation by voice. The robot may have conversation with a user by displaying text data forming conversation with a user generated by the speech generation unit 242 on a built-in display or an external display, for example.

The whole or part of the example embodiments disclosed above can be described as, but not limited to, the following supplementary notes.

(Supplementary Note 1)

A reception apparatus comprising:

a face information acquisition unit that acquires face information of a user;

a conversation processing unit that acquires reception information including a content of conversation with the user;

a face matching unit that matches, against the face information of one user, the face information registered in a user information database in which user information including the face information of the user and the reception information is registered; and a user information management unit that, when a result of matching of the face information performed by the face matching unit is unmatched, registers the user information of the one user to the user information database.

(Supplementary Note 2)

The reception apparatus according to supplementary note 1, wherein the user information acquired by another of the reception apparatus is registered in the user information database.

(Supplementary Note 3)

The reception apparatus according to supplementary note 2, wherein, when a result of matching of the face information performed by the face matching unit is matched, the conversation processing unit utilizes the user information in the user information database having the face information of matched matching to have conversation with the one user.

(Supplementary Note 4)

The reception apparatus according to supplementary note 3, wherein the user information includes reception apparatus information that identifies a reception apparatus which attended the user, and wherein the conversation processing unit changes a content of the conversation with the one user in accordance with whether a reception apparatus identified by the reception apparatus information included in the user information in the user information database having the face information of matched matching is the reception apparatus itself or the another reception apparatus.

(Supplementary Note 5)

The reception apparatus according to supplementary note 4, wherein, when a reception apparatus identified by the reception apparatus information included in the user information in the user information database having the face information of matched matching is the another reception apparatus, the conversation processing unit changes a content of the conversation with the one user in accordance with a distance relationship between the another reception apparatus and the reception apparatus itself.

(Supplementary Note 6)

The reception apparatus according to any one of supplementary notes 3 to 5, wherein the face matching unit matches, against the face information of the one user, the face information of the user information acquired by the reception apparatus itself out of the user information registered in the user information database at a higher priority than the user information acquired by the another reception apparatus.

(Supplementary Note 7)

The reception apparatus according to any one of supplementary notes 1 to 6 further comprising a storage unit that stores the user information database, wherein the user information management unit synchronizes the user information database stored in the storage unit with another user information database stored in another storage unit of a server and updates a content of the user information database to the same content as a content of the another user information database, wherein the another user information database can communicate with the server via a network, and the user information including the face information of the user acquired by a plurality of reception apparatuses and the reception information is registered in the another user information database.

(Supplementary Note 8)

The reception apparatus according to any one of supplementary notes 1 to 6, wherein the user information database is stored in a storage unit of a server with which the user information database can communicate via a network.

(Supplementary Note 9)

The reception apparatus according to any one of supplementary notes 1 to 8 further comprising an image capturing unit that captures a user, wherein the face information acquisition unit extracts a face feature amount as the face information from a face image of the user captured by the image capturing unit.

(Supplementary Note 10)

The reception apparatus according to any one of supplementary notes 1 to 9, wherein the user information database is an anonymous database in which who is a user in the registered user information is unknown.

(Supplementary Note 11)

A reception system comprising reception apparatuses and a server that can communicate with the reception apparatus via a network, wherein each of the reception apparatuses comprises a face information acquisition unit that acquires face information of a user, a conversation processing unit that acquires reception information including a content of conversation with the user, a first storage unit that stores a first user information database in which user information including the face information of the user and the reception information is registered, a face matching unit that matches, against the face information of one user, the face information registered in the first user information database, and a user information management unit that, when a result of matching of the face information performed by the face matching unit is unmatched, registers the user information of the one user to the first user information database in the first storage unit, wherein the server comprises a second storage unit that stores a second user information database in which user information including the face information of the user acquired by the reception apparatuses and the reception information is registered, and wherein the user information management unit synchronizes the first user information database with the second user information database and updates a content of the first user information database to the same content as a content of the second user information database.

(Supplementary Note 12)

The reception system according to supplementary note 11, wherein the user information management unit of each of the reception apparatuses transmits, to the server, the user information registered in the first user information database, and wherein the server registers, to the second user information database, the user information transmitted from the user information management unit of each of the reception apparatuses.

(Supplementary Note 13)

A reception method comprising:

acquiring face information of a user;

acquiring reception information including a content of conversation with the user;

matching, against the face information of one user, the face information registered in a user information database in which user information including the face information of the user and the reception information is registered; and when a result of matching of the face information is unmatched, registering the user information of the one user to the user information database.

(Supplementary Note 14)

The reception method according to supplementary note 13 further comprising, when a result of matching of the face information is matched, utilizing the user information in the user information database having the face information of matched matching to have conversation with the one user.

(Supplementary Note 15)

A storage medium in which a program is stored, the program causing a computer to execute:

acquiring face information of a user;

acquiring reception information including a content of conversation with the user;

matching, against the face information of one user, the face information registered in a user information database in which user information including the face information of the user and the reception information is registered; and when a result of matching of the face information is unmatched, registering the user information of the one user to the user information database.

(Supplementary Note 16)

The storage medium according to supplementary note 15, wherein the program causes the computer to execute, when a result of matching of the face information is matched, utilizing the user information in the user information database having the face information of matched matching to have conversation with the one user.

While the present invention has been described with reference to the example embodiments, the present invention is not limited to the example embodiments described above. Various modifications that can be understood by those skilled in the art can be made to the configuration or the details of the present invention within the scope of the present invention.

REFERENCE SIGNS LIST 10 robot
10a robot A
10b robot B
12 control unit
14 storage unit
16 image capturing unit
18 voice input unit
20 voice output unit
22 face information processing unit
24 conversation processing unit
26 user information management unit
30 reception system
40 DB server
42 control unit
44 storage unit
50 network
220 face detection unit
222 face feature amount extraction unit
228 face matching unit
240 voice recognition unit
242 speech generation unit

The invention claimed is:

1. A reception apparatus comprising:
a memory for storing instructions; and
a processor configured to execute the instructions to:
acquire captured face information;
match the captured face information against stored face information stored in anonymous records in which the stored face information, stored reception information, including a conversation history related to a content of a conversation and a reception date and time when a reception related to the conversation is finished, and location information of the reception apparatus that performed reception regarding the stored reception information, and an anonymous identifier are stored;
store the captured face information, reception information and location information of the reception apparatus that performed reception regarding the reception information to the anonymous records which do not contain a name of a user when a result of matching between the captured face information and the stored face information is unmatched; and
output voice data based on the conversation history and the reception date and time when the result of matching between the captured face information and the stored face information is matched.

2. The reception apparatus according to claim 1, wherein the processor is configured to execute the instructions to: output the voice data based on the conversation history, the reception date and time, an estimated age, and an estimated gender when the result of the matching is matched.

3. The reception apparatus according to claim 1,
wherein the location information includes information about a shop where the reception apparatus that performed the reception is deployed.

4. The reception apparatus according to claim 1,
wherein said reception apparatus and another reception apparatus share user information that is information on the user.

5. The reception apparatus according to claim 4, wherein said reception apparatus and said another reception apparatus are configured to be able to update at the same time as each other in accordance with the user information.

6. A reception method comprising:
acquiring captured face information;
matching the captured face information against stored face information stored in anonymous records in which the stored face information, stored reception information, including a conversation history related to a content of a conversation and a reception date and time when a reception related to the conversation is finished, and location information of the reception apparatus that performed reception regarding the stored reception information, and an anonymous identifier are stored;
storing the captured face information, reception information and location information of the reception apparatus that performed reception regarding the reception information to the anonymous records which do not contain a name of a user when a result of matching between the captured face information and the stored face information is unmatched; and
outputting voice data based on the conversation history and the reception date and time when the result of matching between the captured face information and the stored face information is matched.

7. A non-transitory storage medium in which a program is stored, the program causing a computer to execute:
acquiring captured face information;
matching the captured face information against stored face information stored in anonymous records in which the stored face information, stored reception information, including a conversation history related to a content of a conversation and a reception date and time when a reception related to the conversation is finished, and location information of the reception apparatus that performed reception regarding the stored reception information, and an anonymous identifier are stored;
storing the captured face information, reception information and location information of the reception apparatus that performed reception regarding the reception information to the anonymous records which do not contain a name of a user when a result of matching between the captured face information and the stored face information is unmatched; and outputting voice data based on the conversation history and the reception date and time when the result of matching between the captured face information and the stored face information is matched.

* * * * *